United States Patent
Lin et al.

(10) Patent No.: US 12,089,259 B2
(45) Date of Patent: Sep. 10, 2024

(54) METHOD AND APPARATUS FOR DETERMINING RADIO NETWORK TEMPORARY IDENTIFIER IN TWO-STEP RANDOM ACCESS PROCEDURE

(71) Applicant: Telefonaktiebolaget LM Ericsson (publ), Stockholm (SE)

(72) Inventors: Zhipeng Lin, Nanjing Jiangsu (CN); Andres Reial, Lomma (SE); Jan Christoffersson, Luleå (SE); Henrik Enbuske, Stockholm (SE); Johan Axnäs, Solna (SE); Robert Mark Harrison, Grapevine, TX (US)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 253 days.

(21) Appl. No.: 17/439,985

(22) PCT Filed: Mar. 26, 2020

(86) PCT No.: PCT/CN2020/081452
§ 371 (c)(1),
(2) Date: Sep. 16, 2021

(87) PCT Pub. No.: WO2020/192738
PCT Pub. Date: Oct. 1, 2020

(65) Prior Publication Data
US 2022/0174744 A1    Jun. 2, 2022

(30) Foreign Application Priority Data

Mar. 28, 2019   (WO) ................ PCT/CN2019/080270

(51) Int. Cl.
*H04W 74/0833*   (2024.01)
(52) U.S. Cl.
CPC ............................ *H04W 74/0833* (2013.01)

(58) Field of Classification Search
CPC . H04W 74/0833; H04W 8/26; H04W 74/006; H04W 74/0875; H04W 74/002;
(Continued)

(56) References Cited

U.S. PATENT DOCUMENTS 11,064,534 B2 *  7/2021  Agiwal ............... H04B 17/327
11,202,320 B2 * 12/2021  Agiwal ............ H04W 74/0833
(Continued)

FOREIGN PATENT DOCUMENTS

| CN | 104854947 A | 8/2015 |
| CN | 108282899 A | 7/2018 |

(Continued)

OTHER PUBLICATIONS

"Procedure for Two-step RACH", 3GPP TSG RAN WG1 #96, R1-1902242, Athens, Greece, Feb. 25-Mar. 1, 2019, 1-4.
(Continued)

*Primary Examiner* — Brian T O Connor
(74) *Attorney, Agent, or Firm* — Murphy, Bilak & Homiller, PLLC

(57) ABSTRACT

Various embodiments of the present disclosure provide methods and apparatuses for determining radio network temporary identifier (RNTI) in a two-step random access procedure. A method of a terminal device, comprising: determining a request message for random access, wherein the request message comprises a preamble and a physical uplink shared channel, PUSCH, message and the PUSCH message is determined based on a first radio network temporary identity, RNTI; transmitting the request message; and obtaining a response message for random access based on a second RNTI, wherein the first RNTI and the second RNTI are the same or different.

16 Claims, 11 Drawing Sheets

(58) Field of Classification Search
CPC .......... H04W 74/008; H04W 74/004; H04W 74/0841; H04W 72/0446; H04W 72/0453; H04W 74/0816; H04W 74/0866; H04L 5/0053
See application file for complete search history.

(56) References Cited

U.S. PATENT DOCUMENTS

| | | | | |
|---|---|---|---|---|
| 11,470,650 | B2* | 10/2022 | Lei | H04W 72/04 |
| 11,723,081 | B2* | 8/2023 | Parichehrehteroujeni | H04W 74/0858 455/435.1 |
| 11,871,398 | B2* | 1/2024 | Wang | H04L 25/03866 |
| 2018/0132282 | A1 | 5/2018 | Ly et al. | |
| 2020/0077446 | A1* | 3/2020 | Agiwal | H04W 16/14 |
| 2021/0337601 | A1* | 10/2021 | Agiwal | H04W 24/08 |
| 2022/0116969 | A1* | 4/2022 | He | H04W 72/0446 |
| 2022/0191934 | A1* | 6/2022 | Miao | H04W 74/0833 |
| 2022/0312481 | A1* | 9/2022 | Talarico | H04W 74/0866 |

FOREIGN PATENT DOCUMENTS

| | | |
|---|---|---|
| CN | 108781463 A | 11/2018 |
| EP | 3065488 A1 | 9/2016 |
| WO | 2018081385 A1 | 5/2018 |
| WO | 2018131538 A1 | 7/2018 |

OTHER PUBLICATIONS

3GPP, "3rd Generation Partnership Project; Technical Specification Group Radio Access Network; NR; Medium Access Control (MAC) protocol specification (Release 15)", 3GPP TS 38.321 V15.4.0, Dec. 2018, 1-77.

3GPP, "3rd Generation Partnership Project; Technical Specification Group Radio Access Network; NR; Physical channels and modulation (Release 15)", 3GPP TS 38.211 V15.4.0, Dec. 2018, 1-96.

Motorola Mobility, et al., "2-step RACH procedure", 3GPP TSG RAN WG1 #96, R1-1902843, Athens, Greece, Feb. 25-Mar. 1, 2019, 1-3.

Nokia, et al., "On 2-step Random Access Procedure", 3GPP TSG RAN WG1 Ad-Hoc Meeting 1901, R1-1901192, Taipei, Taiwan, Jan. 21-25, 2019, 1-7.

Panasonic, "Discussion on 2-step RACH procedure", 3GPP TSG RAN WG1 #96, R1-1902394, Athens, Greece, Feb. 25-Mar. 1, 2019, 1-4.

ZTE Corporation, et al., "New work item: 2-step RACH for NR", 3GPP TSG RAN Meeting #82, RP-182894, Sorrento, Italy, Dec. 10-13, 2018, 1-5.

"Summary of 7.2.1.2 Procedure for Two-step RACH", 3GPP TSG RAN WG1 #96, R1-1903436, ZTE, Athens, Greece, Feb. 25-Mar. 1, 2019, 12 pages.

"RNTIs and Contention Resolution for 2-step RA", 3GPP TSG-RAN WG2 #105bis, TDoc R2-1903429, Ericsson, Xi'an, China, Apr. 8-12, 2019, 5 pages.

* cited by examiner

800

Receiving a request message comprising a preamble and a PUSCH message, where the PUSCH message is received based on a RNTI — 802

Generating a response message based on another RNTI — 804

Transmitting the response message — 806

METHOD AND APPARATUS FOR DETERMINING RADIO NETWORK TEMPORARY IDENTIFIER IN TWO-STEP RANDOM ACCESS PROCEDURE

FIELD OF THE INVENTION

The present disclosure generally relates to wireless communications, and more specifically, to methods and apparatuses for a two-step random access procedure.

BACKGROUND

This section introduces aspects that may facilitate a better understanding of the disclosure. Accordingly, the statements of this section are to be read in this light and are not to be understood as admissions about what is in the prior art or what is not in the prior art.

In a new radio (NR) system, a four-step approach may be used for a random access procedure, as shown in FIG. 1. In this approach, a user equipment (UE) detects a synchronization signal (SS) which comprises NR-primary synchronization signal (NR-PSS), NR-secondary synchronization signal (NR-SSS) and NR-physical broadcast channel (PBCH), and decodes broadcasted system information, e.g. remaining minimum system information (RMSI). Then the UE may transmit a physical random access channel (PRACH) preamble (message 1) in uplink (UL). In response to receiving the message 1, a base station (e.g. next generation node B (gNB)) replies with a random access response (RAR, message 2). The RAR message is octet aligned and comprises a timing advance command, a UL grant, and a temporary cell-radio network temporary identifier (TC-RNTI).

After receiving the RAR message, the UE may transmit a message 3 including UE identification and a transport block on a physical uplink shared channel (PUSCH). The gNB then replies with a contention resolution message (message 4). The timing advance command in the RAR message allows the message 3 PUSCH to be received with a timing accuracy within a cyclic prefix (CP). Without this timing advance, a very large CP would be needed in order to be able to demodulate and detect the PUSCH, unless the system is applied in a cell with very small distance between the UE and the gNB. Since NR will also support larger cells with a need for providing a timing advance to the UE, the four-step approach is needed for the random access procedure.

The message 3 PUSCH is scheduled by the UL grant in the RAR message. Retransmissions, if any, of the transport block in the message 3 PUSCH are scheduled by a DCI format 0_0 with cyclic redundancy check (CRC) scrambled by a TC-RNTI provided in the RAR message. The UE always transmits the message 3 PUSCH without repetitions.

In 3GPP TS38.321 v 15.4.0, the disclosure of which is incorporated by reference herein in its entirety, table 1 is provided to define a range of RNTI values as below.

TABLE 1

| Value (hexa-decimal) | RNTI |
| --- | --- |
| 0000 | N/A |
| 0001-FFEF | RA-RNTI, Temporary C-RNTI, C-RNTI, MCS-C-RNTI, CS-RNTI, TPC-PUCCH-RNTI, TPC-PUSCH-RNTI, TPC-SRS-RNTI, INT-RNTI, SFI-RNTI, and SP-CSI-RNTI |

TABLE 1-continued

| Value (hexa-decimal) | RNTI |
| --- | --- |
| FFF0-FFFD | Reserved |
| FFFE | P-RNTI |
| FFFF | SI-RNTI |

A two-step random access procedure has been approved as a work item for NR release 16. As illustrated in FIG. 2, an initial access is completed in only two steps. At the first step, the UE sends a message, which may be called message A, including a random access preamble together with higher layer data such as radio resource control (RRC) connection request possibly with some small payload on PUSCH. At the second step, the gNB sends a response message to the UE, which may be called message B, including e.g. UE identifier assignment, timing advance information, and contention resolution message, etc. Message B is a response message carried in physical downlink shared channel (PDSCH) scheduled by physical downlink control channel (PDCCH) with CRC scrambled by some RNTI.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

The present disclosure proposes a solution for determining RNTI in the two-step random access procedure.

According to a first aspect of the present disclosure, there is provided a method at a terminal device. The method comprises determining a request message for random access, wherein the request message comprises a preamble and a physical uplink shared channel, PUSCH, message and the PUSCH message is determined based on a first radio network temporary identity, RNTI. The method further comprises transmitting the request message.

In accordance with an exemplary embodiment, the method further comprises obtaining a response message for random access based on a second RNTI, wherein the first RNTI and the second RNTI are the same.

In accordance with an exemplary embodiment, the method further comprises obtaining a response message for random access based on a second RNTI, wherein the first RNTI and the second RNTI are different.

In accordance with an exemplary embodiment, the second RNTI is determined based on the Radio Resource Control, RRC, status of the terminal device.

In accordance with an exemplary embodiment, the RRC status comprises: connected mode.

In accordance with an exemplary embodiment, a cell-RNTI, C-RNTI, is determined as the second RNTI if the C-RNTI is available.

In accordance with an exemplary embodiment, the first RNTI is utilized to scrambling encoded bits of the PUSCH message.

In accordance with an exemplary embodiment, the second RNTI is determined based on the first RNTI.

In accordance with an exemplary embodiment, the first RNTI and/or the second RNTI is determined based on: a numbering of a set of physical random access channel, PRACH, occasions.

In accordance with an exemplary embodiment, the set of RNTI values is determined based on a timing/frequency resource of the request message.

According to a second aspect of the present disclosure, there is provided a method at a network node. The method comprises determining a response message based on a second RNTI. The method further comprises transmitting the response message to the terminal device.

In accordance with an exemplary embodiment, the method further comprises obtaining, from a terminal device, a request message comprising a preamble and a physical uplink shared channel, PUSCH, message based on a first radio network temporary identity, RNTI; wherein the first RNTI and the second RNTI are the same.

In accordance with an exemplary embodiment, the method further comprises obtaining, from a terminal device, a request message comprising a preamble and a physical uplink shared channel, PUSCH, message based on a first radio network temporary identity, RNTI; wherein the first RNTI and the second RNTI are different.

In accordance with an exemplary embodiment, the second RNTI is determined based on the Radio Resource Control, RRC, status of the terminal device.

In accordance with an exemplary embodiment, the RRC status comprises: connected mode.

In accordance with an exemplary embodiment, a cell-RNTI, C-RNTI, is determined as the second RNTI if the C-RNTI is available.

In accordance with an exemplary embodiment, the first RNTI is utilized to scrambling encoded bits of the PUSCH message.

In accordance with an exemplary embodiment, the second RNTI is determined based on the first RNTI.

In accordance with an exemplary embodiment, the first RNTI and/or the second RNTI is determined based on: a numbering of a set of physical random access channel, PRACH, occasions.

In accordance with an exemplary embodiment, the set of RNTI values is determined based on a timing/frequency resource of the request message.

According to a third aspect of the present disclosure, there is provided a terminal device. The terminal device comprises a non-transitory computer-readable medium having stored thereon computer-executable instructions; and a processor coupled to the non-transitory computer-readable medium, wherein the computer-executable instructions cause the terminal device to implement the method of the first aspect of the present disclosure.

According to a fourth aspect of the present disclosure, there is provided a network node. The network node comprises a non-transitory computer-readable medium having stored thereon computer-executable instructions; and a processor coupled to the non-transitory computer-readable medium, wherein the computer-executable instructions cause the network node to implement the method of the second aspect of the present disclosure.

According to a fifth aspect of the present disclosure, there is provided a method at a terminal device. The method comprises determining a request message for random access, wherein the request message comprises a preamble and a physical uplink shared channel, PUSCH, message and the PUSCH message is determined based on a first radio network temporary identity, RNTI. The method further comprises transmitting the request message.

In accordance with an exemplary embodiment, the method further comprises obtaining a response message for random access based on a second RNTI, wherein the first RNTI and the second RNTI are the same or different.

In accordance with an exemplary embodiment, the first RNTI and/or the second RNTI is determined based on the Radio Resource Control, RRC, status of the terminal device.

In accordance with an exemplary embodiment, the RRC status comprises: idle mode, connected mode, inactive mode.

In accordance with an exemplary embodiment, a cell-RNTI, C-RNTI, is determined as the first RNTI and/or the second RNTI if the C-RNTI is available.

In accordance with an exemplary embodiment, a configured scheduling RNTI, CS-RNTI, is determined as the first RNTI and/or the second RNTI if the cell-RNTI, C-RNTI, is unavailable.

In accordance with an exemplary embodiment, the first RNTI and/or the second RNTI is determined by selecting a CS-RNTI from a plurality of CS-RNTIs in a broadcasted system information.

In accordance with an exemplary embodiment, the CS-RNTI is randomly selected from the plurality of CS-RNTIs.

In accordance with an exemplary embodiment, the CS-RNTI is selected based on at least one of: one or more of the indexes of the preambles, one or more physical random access channel, PRACH, occasions, a format of the preamble, a PUSCH parameter and the purpose of a radio access, RA, attempt of the terminal device.

In accordance with an exemplary embodiment, the first RNTI is utilized to scrambling encoded bits of the PUSCH message.

In accordance with an exemplary embodiment, the second RNTI is determined based on the first RNTI.

In accordance with an exemplary embodiment, the first RNTI and/or the second RNTI is determined based on at least one of: a numbering of a set of physical random access channel, PRACH, occasions, a numbering of a set of preambles, a numbering of a set of PUSCH occasions and a set of RNTI values, and based on a numbering of the RNTI values in the set.

In accordance with an exemplary embodiment, the numbering of the RNTI values is arranged based on at least one of: an order of indexes of preambles associated with the RNTI values in a PRACH occasion; an order of frequency resource indexes of PRACH occasions associated with the RNTI values; an order of time resource indexes of PRACH occasions associated with the RNTI values; an order of indexes for PRACH slots associated with the RNTI values.

In accordance with an exemplary embodiment, the set of RNTI values is determined based on at least one of: a frequency band utilized, a time gap between the first preamble and the PUSCH, a timing/frequency resource of the request message, and an ID of the terminal device.

According to a sixth aspect of the present disclosure, there is provided a method at a terminal device. The method comprises determining a request message for random access, wherein the request message comprises a preamble and a physical uplink shared channel, PUSCH, message and the PUSCH message is determined based on an identity, ID, of a cell in which the terminal device is located. The method further comprises transmitting the request message.

In accordance with an exemplary embodiment, the method further comprises obtaining (310) a response message for random access based on a second RNTI, wherein the second RNTI is determined based on an ID of the terminal device.

According to a seventh aspect of the present disclosure, there is provided a method at a network node. The method comprises determining a response message based on a second RNTI. The method further comprises transmitting the response message to the terminal device.

In accordance with an exemplary embodiment, the method further comprises obtaining, from a terminal device, a request message comprising a preamble and a physical uplink shared channel, PUSCH, message based on a first radio network temporary identity, RNTI; wherein the first RNTI and the second RNTI are the same or different.

In accordance with an exemplary embodiment, the first RNTI and/or the second RNTI is determined based on the Radio Resource Control, RRC, status of the terminal device.

In accordance with an exemplary embodiment, wherein the RRC status comprises: idle mode, connected mode, inactive mode.

In accordance with an exemplary embodiment, a cell-RNTI, C-RNTI, is determined as the first RNTI and/or the second RNTI if the C-RNTI is available.

In accordance with an exemplary embodiment, a configured scheduling RNTI, CS-RNTI, is determined as the first RNTI and/or the second RNTI if the cell-RNTI, C-RNTI, is unavailable.

In accordance with an exemplary embodiment, the first RNTI and/or the second RNTI is determined by selecting a CS-RNTI from a plurality of CS-RNTIs in a broadcasted system information.

In accordance with an exemplary embodiment, the CS-RNTI is randomly selected from the plurality of CS-RNTIs.

In accordance with an exemplary embodiment, the CS-RNTI is selected based on at least one of: one or more of the indexes of the preambles, one or more physical random access channel, PRACH, occasions, a format of the preamble, a PUSCH parameter and the purpose of a radio access, RA, attempt of the terminal device.

In accordance with an exemplary embodiment, the first RNTI is utilized to scrambling encoded bits of the PUSCH message.

In accordance with an exemplary embodiment, the second RNTI is determined based on the first RNTI.

In accordance with an exemplary embodiment, the method further comprises obtaining, from a terminal device, a request message comprising a preamble and a PUSCH message based on an identity, ID, of a cell in which the terminal device is located.

In accordance with an exemplary embodiment, the first RNTI and/or the second RNTI is determined based on an ID of the terminal device.

In accordance with an exemplary embodiment, the first RNTI and/or the second RNTI is determined based on at least one of: a numbering of a set of physical random access channel, PRACH, occasions, a numbering of a set of preambles, a numbering of a set of PUSCH occasions and a set of RNTI values, and based on a numbering of the RNTI values in the set.

In accordance with an exemplary embodiment, the numbering of the RNTI values is arranged based on at least one of: an order of indexes of preambles associated with the RNTI values in a PRACH occasion; an order of frequency resource indexes of PRACH occasions associated with the RNTI values; an order of time resource indexes of PRACH occasions associated with the RNTI values; an order of indexes for PRACH slots associated with the RNTI values.

In accordance with an exemplary embodiment, the set of RNTI values is determined based on at least one of: a frequency band utilized, a time gap between the first preamble and the PUSCH, a timing/frequency resource of the request message, and an ID of the terminal device.

According to an eighth aspect of the present disclosure, there is provided a terminal device. The terminal device comprises a non-transitory computer-readable medium having stored thereon computer-executable instructions; and a processor coupled to the non-transitory computer-readable medium, wherein the computer-executable instructions cause the terminal device to implement the method according to the fifth aspect of the present disclosure.

According to a ninth aspect of the present disclosure, there is provided a network node, comprising: a non-transitory computer-readable medium having stored thereon computer-executable instructions; and a processor coupled to the non-transitory computer-readable medium, wherein the computer-executable instructions cause the network node to implement the method according to a seventh aspect of the present disclosure.

According to a tenth aspect of the present disclosure, there is provided a method at a terminal device. The method comprises obtaining a response message for random access based on a second radio network temporary identity, RNTI, wherein the response message is a response to a request message for random access, and the request message comprises a preamble and a physical uplink shared channel, PUSCH, message.

In accordance with an exemplary embodiment, the PUSCH message is determined based on a first RNTI, and the first RNTI and the second RNTI are the same or different.

In accordance with an exemplary embodiment, the first RNTI and/or the second RNTI is determined based on the Radio Resource Control, RRC, status of the terminal device.

In accordance with an exemplary embodiment, the RRC status comprises: idle mode, connected mode, inactive mode.

In accordance with an exemplary embodiment, a cell-RNTI, C-RNTI, is determined as the first RNTI and/or the second RNTI if the C-RNTI is available.

In accordance with an exemplary embodiment, a configured scheduling RNTI, CS-RNTI, is determined as the first RNTI and/or the second RNTI if the cell-RNTI, C-RNTI, is unavailable.

In accordance with an exemplary embodiment, the first RNTI and/or the second RNTI is determined by selecting a CS-RNTI from a plurality of CS-RNTIs in a broadcasted system information.

In accordance with an exemplary embodiment, the CS-RNTI is randomly selected from the plurality of CS-RNTIs.

In accordance with an exemplary embodiment, the CS-RNTI is selected based on at least one of: one or more of the indexes of the preambles, one or more physical random access channel, PRACH, occasions, a format of the preamble, a PUSCH parameter and the purpose of a radio access, RA, attempt of the terminal device.

In accordance with an exemplary embodiment, the first RNTI is utilized to scrambling encoded bits of the PUSCH message.

In accordance with an exemplary embodiment, the second RNTI is determined based on the first RNTI.

In accordance with an exemplary embodiment, the method further comprises determining a request message comprising a preamble and a PUSCH message based on an identity, ID, of a cell in which the terminal device is located.

In accordance with an exemplary embodiment, the first RNTI and/or the second RNTI is determined based on an ID of the terminal device.

In accordance with an exemplary embodiment, the first RNTI and/or the second RNTI is determined based on at least one of: a numbering of a set of physical random access channel, PRACH, occasions, a numbering of a set of preambles, a numbering of a set of PUSCH occasions and a set of RNTI values, and based on a numbering of the RNTI values in the set.

In accordance with an exemplary embodiment, the numbering of the RNTI values is arranged based on at least one of: an order of indexes of preambles associated with the RNTI values in a PRACH occasion; an order of frequency resource indexes of PRACH occasions associated with the RNTI values; an order of time resource indexes of PRACH occasions associated with the RNTI values; an order of indexes for PRACH slots associated with the RNTI values.

In accordance with an exemplary embodiment, the set of RNTI values is determined based on at least one of: a frequency band utilized, a time gap between the first preamble and the PUSCH, a timing/frequency resource of the request message, and an ID of the terminal device.

According to an eleventh aspect of the present disclosure, there is provided a method at a network node. The method comprises obtaining, from a terminal device, a request message comprising a preamble and a physical uplink shared channel, PUSCH, message based on a first radio network temporary identity, RNTI.

In accordance with an exemplary embodiment, the method further comprises determining a response message based on a second RNTI. The method further comprises transmitting the response message to the terminal device.

In accordance with an exemplary embodiment, the first RNTI and/or the second RNTI is determined based on the Radio Resource Control, RRC, status of the terminal device.

In accordance with an exemplary embodiment, the RRC status comprises: idle mode, connected mode, inactive mode.

In accordance with an exemplary embodiment, a cell-RNTI, C-RNTI, is determined as the first RNTI and/or the second RNTI if the C-RNTI is available.

In accordance with an exemplary embodiment, a configured scheduling RNTI, CS-RNTI, is determined as the first RNTI and/or the second RNTI if the cell-RNTI, C-RNTI, is unavailable.

In accordance with an exemplary embodiment, the first RNTI and/or the second RNTI is determined by selecting a CS-RNTI from a plurality of CS-RNTIs in a broadcasted system information.

In accordance with an exemplary embodiment, the CS-RNTI is randomly selected from the plurality of CS-RNTIs.

In accordance with an exemplary embodiment, the CS-RNTI is selected based on at least one of: one or more of the indexes of the preambles, one or more physical random access channel, PRACH, occasions, a format of the preamble, a PUSCH parameter and the purpose of a radio access, RA, attempt of the terminal device.

In accordance with an exemplary embodiment, the first RNTI is utilized to scrambling encoded bits of the PUSCH message.

In accordance with an exemplary embodiment, the second RNTI is determined based on the first RNTI.

In accordance with an exemplary embodiment, the first RNTI and/or the second RNTI is determined based on an ID of the terminal device.

In accordance with an exemplary embodiment, the first RNTI and/or the second RNTI is determined based on at least one of: a numbering of a set of physical random access channel, PRACH, occasions, a numbering of a set of preambles, a numbering of a set of PUSCH occasions and a set of RNTI values, and based on a numbering of the RNTI values in the set.

In accordance with an exemplary embodiment, the numbering of the RNTI values is arranged based on at least one of: an order of indexes of preambles associated with the RNTI values in a PRACH occasion; an order of frequency resource indexes of PRACH occasions associated with the RNTI values; an order of time resource indexes of PRACH occasions associated with the RNTI values; an order of indexes for PRACH slots associated with the RNTI values.

In accordance with an exemplary embodiment, the set of RNTI values is determined based on at least one of: a frequency band utilized, a time gap between the first preamble and the PUSCH, a timing/frequency resource of the request message, and an ID of the terminal device.

According to a twelfth aspect of the present disclosure, there is provided a method at a network node. The method comprises obtaining, from a terminal device, a request message comprising a preamble and a physical uplink shared channel, PUSCH, message based on a cell in which the terminal device is located.

In accordance with an exemplary embodiment, the method further comprises determining a response message based on a RNTI. The method further comprises transmitting the response message to the terminal device, wherein the RNTI is determined based on an ID of the terminal device.

According to a thirteenth aspect of the present disclosure, there is provided a terminal device. The terminal device comprises a non-transitory computer-readable medium having stored thereon computer-executable instructions; and a processor coupled to the non-transitory computer-readable medium, wherein the computer-executable instructions cause the terminal device to implement the method according to the tenth aspect of the present disclosure.

According to a fourteenth aspect of the present disclosure, there is provided a network node. The network node comprises a non-transitory computer-readable medium having stored thereon computer-executable instructions; and a processor coupled to the non-transitory computer-readable medium, wherein the computer-executable instructions cause the network node to implement the method according to the eleventh first aspect of the present disclosure.

According to a fifteenth aspect of the present disclosure, there is provided a network node. The network node comprises a non-transitory computer-readable medium having stored thereon computer-executable instructions; and a processor coupled to the non-transitory computer-readable medium, wherein the computer-executable instructions cause the network node to implement the method according to the twelfth aspect of the present disclosure.

According to a sixteenth aspect of the present disclosure, there is provided a terminal device. The terminal device comprises a non-transitory computer-readable medium having stored thereon computer-executable instructions; and a processor coupled to the non-transitory computer-readable medium, wherein the computer-executable instructions cause the terminal device to implement the method according to a sixth aspect of the present disclosure.

According to a seventeenth aspect of the present disclosure, there is provided a non-transitory computer-readable medium having program codes embodied thereon for use with a computing device, wherein the program codes, upon executed by a processor, performs the method according to any of the first, second, fifth, sixth, seventh, tenth, eleventh and twelfth aspects of the present disclosure.

According to another aspect of the present disclosure, there is provided a method implemented in a communication system which may include a host computer, a base station and a UE. The method may comprise providing user data at the host computer. Optionally, the method may comprise, at the host computer, initiating a transmission carrying the user data to the UE via a cellular network comprising the base station which may perform any step of the method according to any of the second, seventh, eleventh and twelfth aspects of the present disclosure.

According to another aspect of the present disclosure, there is provided a communication system including a host computer. The host computer may comprise processing circuitry configured to provide user data, and a communication interface configured to forward the user data to a cellular network for transmission to a UE. The cellular network may comprise a base station having a radio interface and processing circuitry. The base station's processing circuitry may be configured to perform any step of the method according to any of the second, seventh, eleventh and twelfth aspects of the present disclosure.

According to another aspect of the present disclosure, there is provided a method implemented in a communication system which may include a host computer, a base station and a UE. The method may comprise providing user data at the host computer. Optionally, the method may comprise, at the host computer, initiating a transmission carrying the user data to the UE via a cellular network comprising the base station. The UE may perform any step of the method according to any of the first, fifth, sixth, and tenth aspects of the present disclosure.

According to another aspect of the present disclosure, there is provided a communication system including a host computer. The host computer may comprise processing circuitry configured to provide user data, and a communication interface configured to forward user data to a cellular network for transmission to a UE. The UE may comprise a radio interface and processing circuitry. The UE's processing circuitry may be configured to perform any step of the method according to any of the first, fifth, sixth, and tenth aspects of the present disclosure.

According to another aspect of the present disclosure, there is provided a method implemented in a communication system which may include a host computer, a base station and a UE. The method may comprise, at the host computer, receiving user data transmitted to the base station from the UE which may perform any step of the method according to any of the second, seventh, eleventh and twelfth aspects of the present disclosure.

According to another aspect of the present disclosure, there is provided a communication system including a host computer. The host computer may comprise a communication interface configured to receive user data originating from a transmission from a UE to a base station. The UE may comprise a radio interface and processing circuitry. The UE's processing circuitry may be configured to perform any step of the method according to any of the first, fifth, sixth, and tenth aspects of the present disclosure.

According to another aspect of the present disclosure, there is provided a method implemented in a communication system which may include a host computer, a base station and a UE. The method may comprise, at the host computer, receiving, from the base station, user data originating from a transmission which the base station has received from the UE. The base station may perform any step of the method according to any of the second, seventh, eleventh and twelfth aspects of the present disclosure.

According to another aspect of the present disclosure, there is provided a communication system which may include a host computer. The host computer may comprise a communication interface configured to receive user data originating from a transmission from a UE to a base station. The base station may comprise a radio interface and processing circuitry. The base station's processing circuitry may be configured to perform any step of the method according to any of the second, seventh, eleventh and twelfth aspects of the present disclosure.

According to another aspect of the present disclosure, there is provided a terminal device. The terminal device comprises a determining unit for determining a request message for random access, wherein the request message comprises a preamble and a physical uplink shared channel, PUSCH, message and the PUSCH message is determined based on a first radio network temporary identity, RNTI; and a transmitting unit for transmitting (308) the request message According to another aspect of the present disclosure, there is provided a terminal device. The terminal device comprises a determining unit for determining a request message for random access, wherein the request message comprises a preamble and a physical uplink shared channel, PUSCH, message and the PUSCH message is determined based on an identity, ID, of a cell in which the terminal device is located; and a transmitting unit for the request message.

According to another aspect of the present disclosure, there is provided a network node. The network node comprises a determining unit for determining a response message based on a second RNTI; and transmitting the response message to the terminal device.

According to another aspect of the present disclosure, there is provided a terminal device. The terminal device comprises a determining unit for obtaining a response message for random access based on a second radio network temporary identity, RNTI, wherein the response message is a response to a request message for random access, and the request message comprises a preamble and a physical uplink shared channel, PUSCH, message.

According to another aspect of the present disclosure, there is provided a network node. The network node comprises an obtaining unit for obtaining, from a terminal device, a request message comprising a preamble and a physical uplink shared channel, PUSCH, message based on a first radio network temporary identity, RNTI.

According to another aspect of the present disclosure, there is provided a network node. The network node comprises an obtaining unit for obtaining, from a terminal device, a request message comprising a preamble and a physical uplink shared channel, PUSCH, message based on a cell in which the terminal device is located.

BRIEF DESCRIPTION OF THE DRAWINGS

The disclosure itself, the preferable mode of use and further objectives are best understood by reference to the following detailed description of the embodiments when read in conjunction with the accompanying drawings, in which.

DETAILED DESCRIPTION

Figure 1:
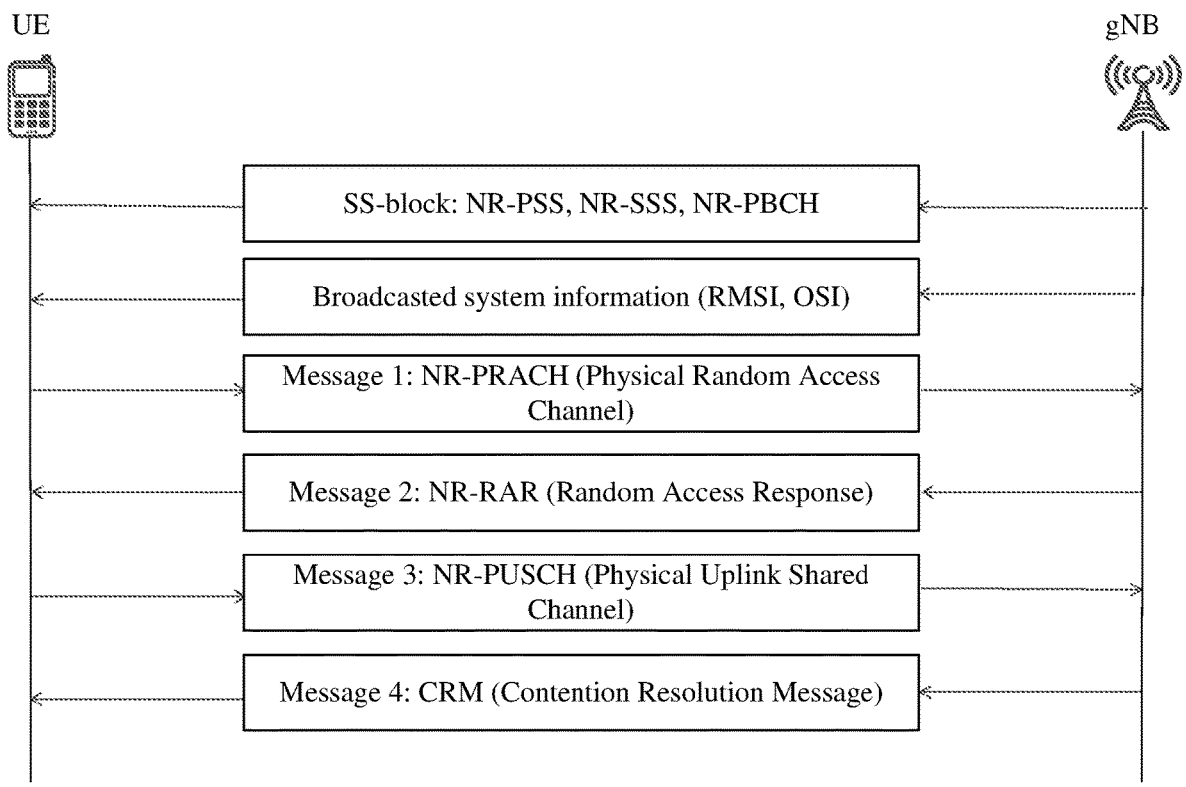
FIG. 1 is a diagram illustrating a four-step random access procedure in NR.

The embodiments of the present disclosure are described in detail with reference to the accompanying drawings. It should be understood that these embodiments are discussed only for the purpose of enabling those skilled persons in the art to better understand and thus implement the present disclosure, rather than suggesting any limitations on the scope of the present disclosure. Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional features and advantages may be recognized in certain embodiments that may not be present in all embodiments of the disclosure.

As used herein, the term "communication network" refers to a network following any suitable communication standards, such as new radio (NR), long term evolution (LTE), LTE-Advanced, wideband code division multiple access (WCDMA), high-speed packet access (HSPA), and so on. Furthermore, the communications between a terminal device and a network node in the communication network may be performed according to any suitable generation communication protocols, including, but not limited to, the first generation (1G), the second generation (2G), 2.5G, 2.75G, the third generation (3G), 4G, 4.5G, 5G communication protocols, and/or any other protocols either currently known or to be developed in the future.

The term "network node" refers to a network device in a communication network via which a terminal device accesses to the network and receives services therefrom. The network node or network device may refer to a base station (BS), an access point (AP), a multi-cell/multicast coordination entity (MCE), a controller or any other suitable device in a wireless communication network. The BS may be, for example, a node B (NodeB or NB), an evolved NodeB (eNodeB or eNB), a next generation NodeB (gNodeB or gNB), an IAB node, a remote radio unit (RRU), a radio header (RH), a remote radio head (RRH), a relay, a low power node such as a femto, a pico, and so forth.

Yet further examples of the network node comprise multi-standard radio (MSR) radio equipment such as MSR BSs, network controllers such as radio network controllers (RNCs) or base station controllers (BSCs), base transceiver stations (BTSs), transmission points, transmission nodes, positioning nodes and/or the like. More generally, however, the network node may represent any suitable device (or group of devices) capable, configured, arranged, and/or operable to enable and/or provide a terminal device access to a wireless communication network or to provide some service to a terminal device that has accessed to the wireless communication network.

The term "terminal device" refers to any end device that can access a communication network and receive services therefrom. By way of example and not limitation, the terminal device may refer to user equipment (UE), or other suitable devices. The UE may be, for example, a subscriber station, a portable subscriber station, a mobile station (MS) or an access terminal (AT). The terminal device may include, but not limited to, portable computers, image capture terminal devices such as digital cameras, gaming terminal devices, music storage and playback appliances, a mobile phone, a cellular phone, a smart phone, a tablet, a wearable device, a personal digital assistant (PDA), a vehicle, and the like.

As yet another specific example, in an Internet of things (IoT) scenario, a terminal device may also be called an IoT device and represent a machine or other device that performs monitoring, sensing and/or measurements etc., and transmits the results of such monitoring, sensing and/or measurements etc. to another terminal device and/or network equipment. The terminal device may in this case be a machine-to-machine (M2M) device, which may in a 3rd generation partnership project (3GPP) context be referred to as a machine-type communication (MTC) device.

As one particular example, the terminal device may be a UE implementing the 3GPP narrow band Internet of things (NB-IoT) standard. Particular examples of such machines or devices are sensors, metering devices such as power meters, industrial machinery, or home or personal appliances, e.g. refrigerators, televisions, personal wearables such as watches etc. In other scenarios, a terminal device may represent a vehicle or other equipment, for example, a medical instrument that is capable of monitoring, sensing and/or reporting etc. on its operational status or other functions associated with its operation.

As used herein, the terms "first", "second" and so forth refer to different elements. The singular forms "a" and "an" are intended to include the plural forms as well, unless the context clearly indicates otherwise. The terms "comprises", "comprising", "has", "having", "includes" and/or "including" as used herein, specify the presence of stated features, elements, and/or components and the like, but do not preclude the presence or addition of one or more other features, elements, components and/or combinations thereof. The term "based on" is to be read as "based at least in part on". The term "one embodiment" and "an embodiment" are to be read as "at least one embodiment". The term "another embodiment" is to be read as "at least one other embodiment". Other definitions, explicit and implicit, may be included below.

Figure 2:
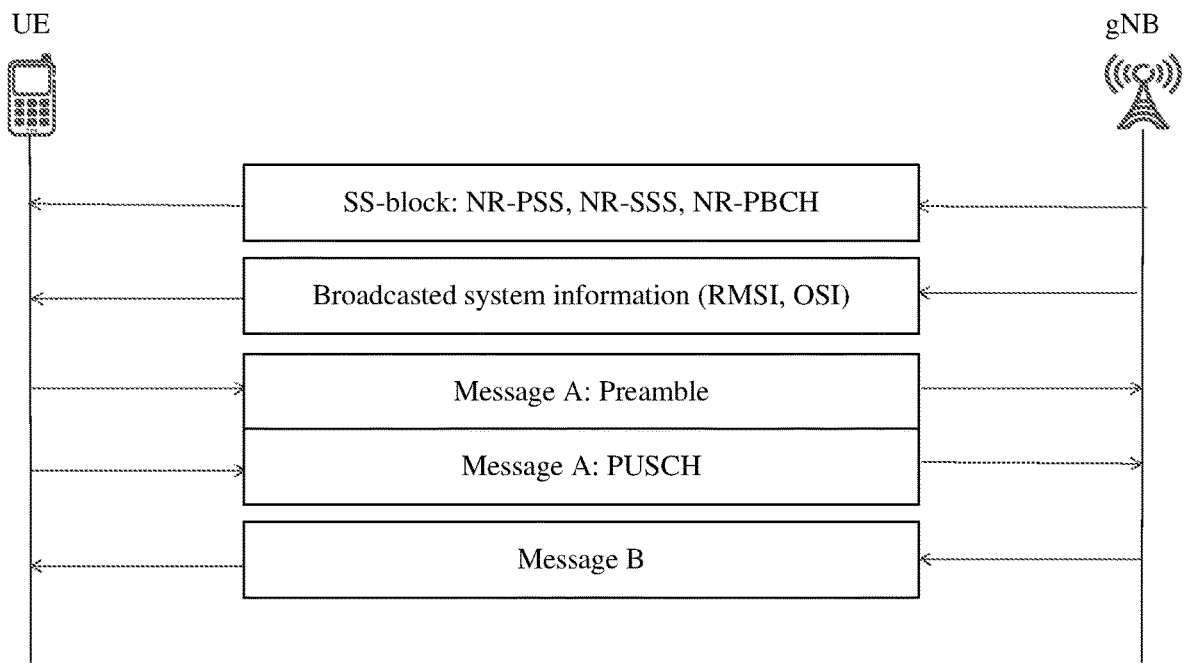
FIG. 2 is a diagram illustrating a two-step random access procedure in NR.

As described above, in the two-step random access procedure as shown in FIG. 2, the preamble and the PUSCH message will be transmitted by the UE in one message called message A before the UE receives the response message called massage B from the gNB. But for the PUSCH message in message A, as no RAR message is received from the gNB, there is no TC-RNTI available for PUSCH handling. Additionally, in message A, for each preamble, different RNTI values of PUSCH may be needed to avoid collision of PUSCHs between different messages A especially when more than one PUSCH are on the same timing frequency resource. Additionally, in order to differentiate the message 2 in the four-step random access procedure and the message B in the two-step random access procedure, there is a need to use different RNTIs. Therefore, it would be desirable to provide a solution for determining the RNTI for the PUSCH in message A and/or the PDCCH CRC scrambling and PDSCH scrambling in message B in the two-step random access procedure.

In accordance with some exemplary embodiments described throughout this disclosure, the present disclosure provides improved solutions for the two-step random access procedure. These solutions may be applied to a wireless communication system including a terminal device and a base station. In the two-step random access procedure, the terminal device may determine a RNTI to be used for a PUSCH in a request message (e.g. message A) based on broadcasted system information, and then the terminal device may transmit the request message based on the determined RNTI. With the improved solutions, the RNTI used for the PUSCH in message A and/or the PDCCH CRC scrambling and PDSCH scrambling in message B can be determined.

It is noted that some embodiments of the present disclosure are mainly described in relation to 5G specifications being used as non-limiting examples for certain exemplary network configurations and system deployments. As such, the description of exemplary embodiments given herein specifically refers to terminology which is directly related thereto. Such terminology is only used in the context of the presented non-limiting examples and embodiments, and does not limit the present disclosure naturally in any way. Rather, any other system configuration or radio technologies may equally be utilized as long as exemplary embodiments described herein are applicable.

Figure 3:
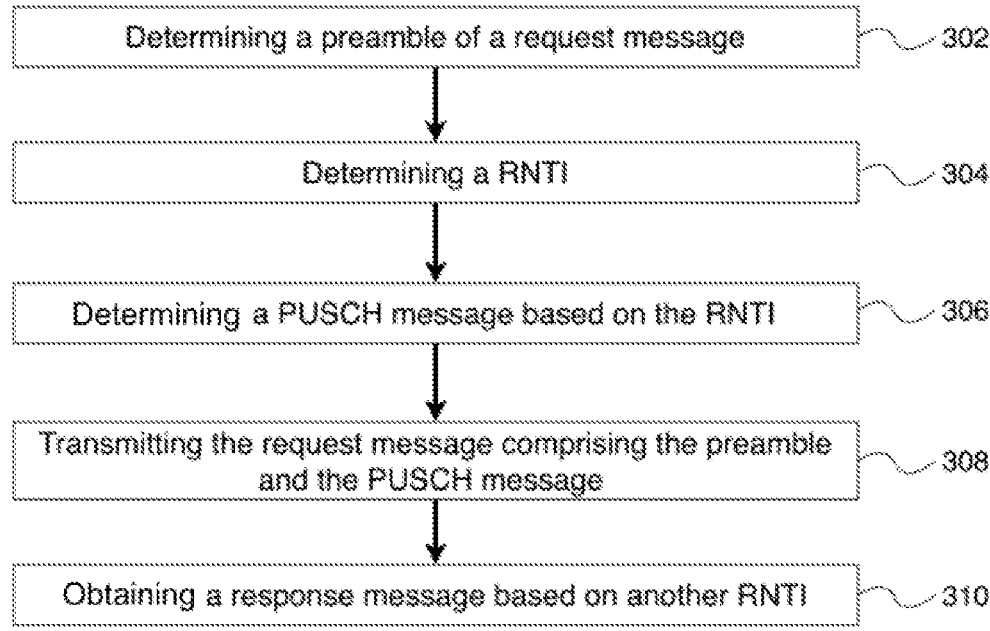
FIG. 3 is a flowchart illustrating a method 300 according to some embodiments described throughout this disclosure.

FIG. 3 is a flowchart illustrating a method 300 according to some embodiments described throughout this disclosure. The method 300 illustrated in FIG. 3 may be performed by an apparatus implemented in a terminal device or communicatively coupled to a terminal device. In accordance with an exemplary embodiment, the terminal device may be a UE.

According to the exemplary method 300 illustrated in FIG. 3, the terminal device may determine a preamble of a request message for a two-step random access procedure, as shown in block 302. In some embodiments, the preamble may be determined according to a set of preambles. The set of preambles may be specific for the two-step random access procedure. Alternatively, the set of preambles may be the same as those for the four-step random access procedure. In some embodiments, the set of preambles may be signaled in a signaling message from a network node such as a base station (e.g. a gNB). The signaling message may be a radio resource control (RRC) message. Alternatively, in some embodiments, the set of preambles may be predefined in the terminal device.

In block 304, the terminal device may determine a first RNTI used for the PUSCH message in the request message for the two-step random access procedure. The terminal device may determine the first RNTI by selecting one of a plurality of RNTI values in broadcasted system information. The broadcasted system information comprises remaining minimum system information (RMSI) or other system information (OSI). In some embodiments, the plurality of configured scheduling RNTIs (CS-RNTIs) are provided in the broadcasted system information. Therefore, the terminal device may select one of the plurality of CS-RNTIs in the broadcasted system information as the first RNTI. In one embodiment, the terminal device may randomly select one of the plurality of CS-RNTIs. In another embodiment, the terminal device may select one of the plurality of CS-RNTI based on at least one of: an index of the determined preamble, a physical random access channel (PRACH) occasion of the determined preamble, a format of the determined preamble, a PUSCH parameter and the purpose of a radio access (RA) attempt of the terminal device. In yet another embodiment, the terminal device may determine the first RNTI based on an identity (ID) of a cell in which the terminal device is located.

After determining the RNTI in block 304, in block 306, the terminal device may generate a PUSCH message based on the determined first RNTI. Generally, the determined first RNTI is utilized to scrambling encoded bits of the PUSCH message. The request message may comprise the preamble determined in block 302 and the PUSCH message. The preamble may be transmitted in the PRACH occasion, and the PUSCH message may be transmitted in the PUSCH occasion. Then, the request message including the preamble and the PUSCH message is determined. Then in block 308, the terminal device may transmit the request message (i.e. message A) to the network node in the two-step random access procedure.

In response to transmitting the request message, the terminal device may obtain a response message (e.g. message B) based on a second RNTI from the network node, as shown in block 310. Specifically, the terminal device may utilize the second RNTI to receive a physical downlink control channel (PDCCH) message scheduling a physical downlink shared channel (PDSCH) carrying the response message. The second RNTI may be the same as or different from the first RNTI. In some embodiments, the second RNTI is generated based on the first RNTI. For example, the second RNTI may be formed as a function/mapping of the first RNTI used in message A. Specifically, the network node may select a second RNTI (e.g., RA-RNTI) from a group of possibilities using a hash or a subset of bits of the first RNTI used in message A. The function/mapping relationship between the first and second RNTI allows the network node and the terminal device to efficiently differentiate message B in two-step random access procedure from message 2 in four-step random access procedure. In some other embodiments, if the first RNTI is determined based on the ID of the cell in which the terminal device is located, the network node may use the cell ID of the terminal device carried in message A PUSCH to determine the second RNTI so as to scramble the CRC of a PDCCH message for message B.

Figure 4:
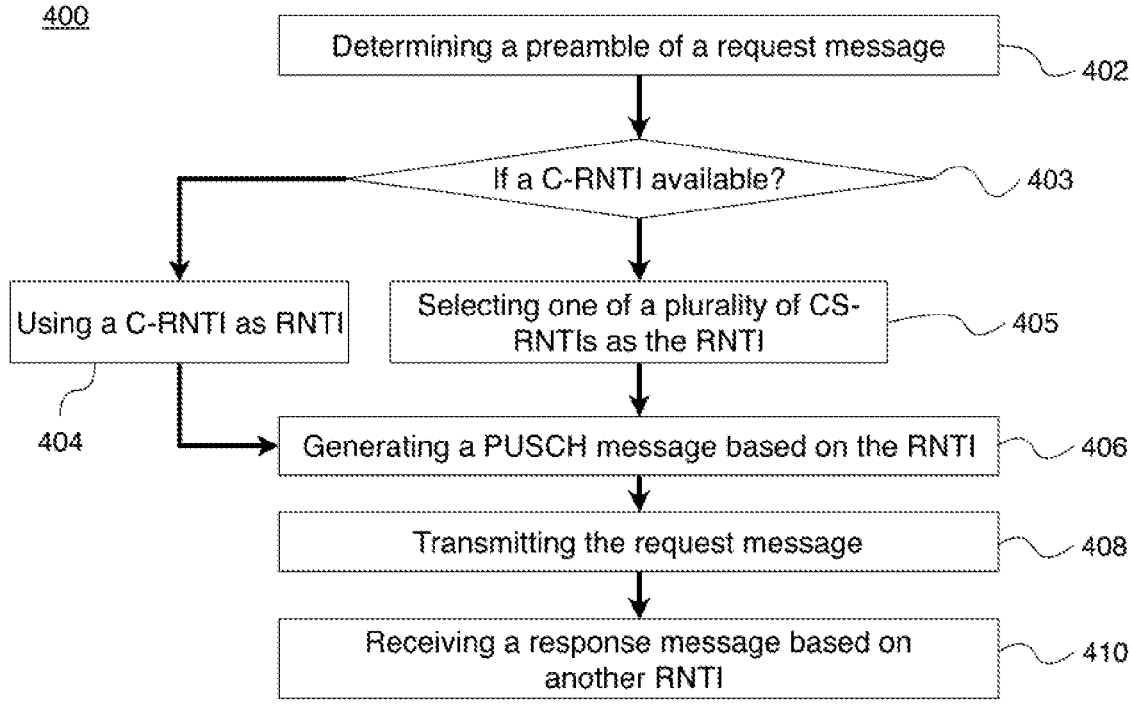
FIG. 4 is a flowchart illustrating a method 400 according to some embodiments described throughout this disclosure.

FIG. 4 is a flowchart illustrating a method 400 according to some embodiments described throughout this disclosure. The method 400 illustrated in FIG. 4 may be performed by an apparatus implemented in a terminal device or communicatively coupled to a terminal device. In accordance with an exemplary embodiment, the terminal device may be a UE. In the following description with respect to FIG. 4, for the same or similar parts as those in the previous exemplary embodiments, the detailed description will be properly omitted.

According to the exemplary method 400 illustrated in FIG. 4, the terminal device may determine a preamble of a request message for a two-step random access procedure, as shown in block 402. In block 403, the terminal device may determine whether a C-RNTI is available. If the C-RNTI is available, the terminal device will utilize the C-RNTI itself as the first RNTI, as shown in block 404. For example, if the terminal device is in RRC connected mode and is used perform Contention Free Random Access (CFRA), it will have a C-RNTI. Accordingly, the terminal device may use the C-RNTI as the first RNTI.

If the C-RNTI is not available, then in block 405, the terminal device will select one of a plurality of CS-RNTIs in the broadcasted system information based on the preamble determined in block 402. For example, if the terminal device is in an idle mode, then it does not possess a valid C-RNTI. Accordingly, the terminal device may select one CS-RNTI as the first RNTI. The terminal device may select one of the plurality of CS-RNTI based on at least one of: an index of the determined preamble, a physical random access channel (PRACH) occasion of the determined preamble, a format of the determined preamble, a PUSCH parameter and the purpose of a radio access (RA) attempt of the terminal device. It is noted that the CS-RNTI can have one or multiple RNTI values which can be cell specifically configured. The CS-RNTI values may be provided in the broadcasted system information (e.g. in the RMSI or OSI). The terminal device selects the actual CS-RNTI value to be used from the configured multiple-value set.

In accordance with an exemplary embodiment, the RNTI may depend on the RRC status. The RRC status comprises an idle mode, a connected mode, and an inactive mode. For example, if the terminal device is in inactive mode and performing Contention Based Random Access (CBRA), it may use a CS-RNTI that is based on its C-RNTI, e.g. a function of some bits in the C-RNTI. This reduces the blind decoding complexity for the network node, compared to tentatively detecting the C-RNTIs of all inactive terminal device in the system or the tracking area. In one embodiment, if one or more UE attempts with C-RNTI or C-RNTI-based CS-RNTI are unsuccessful, it may revert to the approach where the UE does not possess valid C-RNTI above for subsequent attempts.

After determining the RNTI in block 404 or 405, in block 406, the terminal device may generate a PUSCH message based on the determined RNTI (i.e. first RNTI). Generally, the determined RNTI is used for scrambling the PUSCH payload for the request message (message A) in the two-step random access procedure. Then in block 408, the terminal device may transmit a request message (e.g. message A) to the network node in the two-step random access procedure. The request message may comprise the preamble determined in block 402 and the PUSCH message generated in block 406. In one embodiment, the network node detects the PUSCH message after detecting the preamble in the request message and can use the configuration information obtained by the preamble to receive the PUSCH message. In another embodiment, the network node may not require detecting the preamble in the request message (e.g. if the transmission at hand is a retransmission of the request message without retransmitting the preamble), and blindly decode the PUSCH message based on the plurality of possible CS-RNTI values.

In response to transmitting the request message, the terminal device may receive a response message (e.g. message B) based on another RNTI (i.e. a second RNTI) from the network node, as shown in block 410. The network node selects the second RNTI used for scrambling the CRC of the PDCCH message for the message B in the two-step random access procedure based on the received RNTI derived from the PUSCH message. In this embodiment, the network node uses the RNTI (e.g. C-RNTI or CS-RNTI) used by the terminal device in the PUSCH message (message A) to scramble the CRC of the PDCCH message for message B. The network node detects the CS-RNTI based on the received preamble of the request message or based on blind detection of PUSCH message of the request message. That RNTI then functionally becomes a new RA-RNTI for the given network node. Alternatively, the new RA-RNTI may be formed not as a copy but as a function/mapping of the C-RNTI or CS-RNTI used in the request message, e.g. selecting a RA-RNTI from a group of possibilities using a hash or a subset of bits of the RNTI used in the request message.

Figure 5:
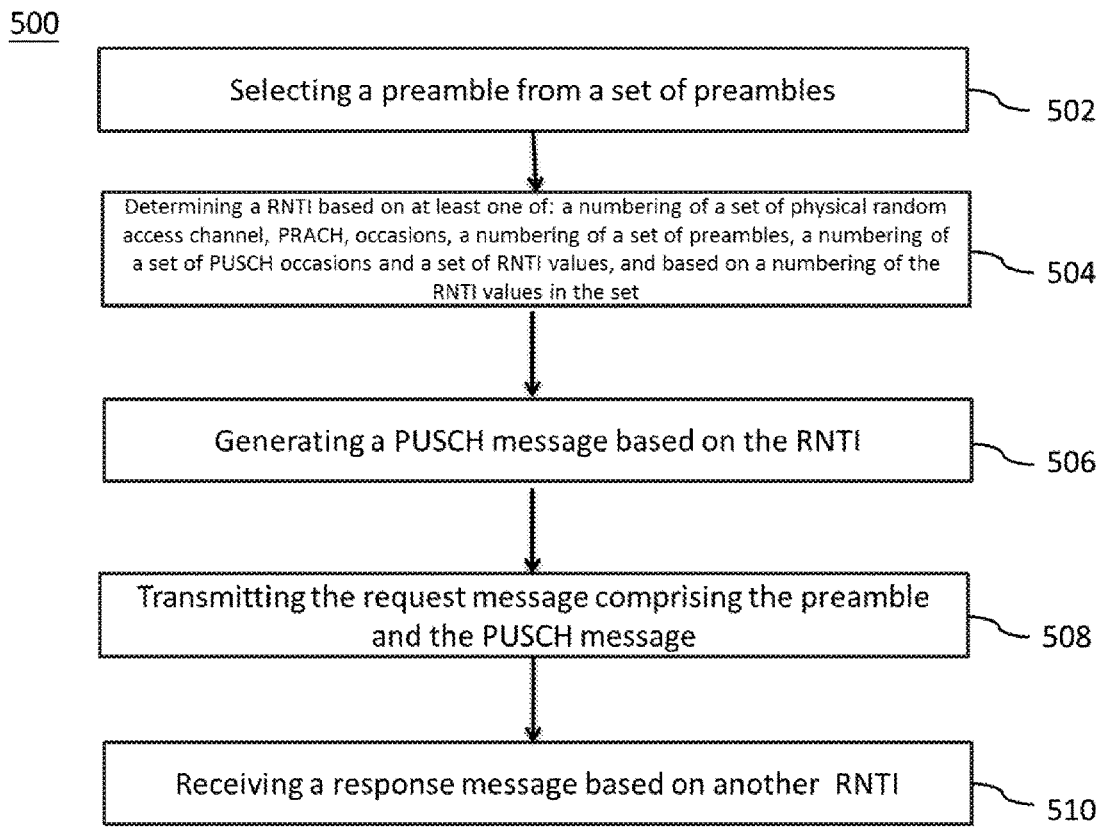
FIG. 5 is a flowchart illustrating a method 500 according to some embodiments described throughout this disclosure.

FIG. 5 is a flowchart illustrating a method 500 according to some embodiments described throughout this disclosure. The method 500 illustrated in FIG. 5 may be performed by an apparatus implemented in a terminal device or communicatively coupled to a terminal device. In accordance with an exemplary embodiment, the terminal device may be a UE.

According to the exemplary method 500 illustrated in FIG. 5, the terminal device may selecting a first preamble from a set of preambles for a request message, as shown in block 502. The set of preambles may be specific for the two-step random access procedure. Alternatively, the set of preambles may be the same as those for the four-step random access procedure. In some embodiments, the set of preambles may be signaled in a signaling message from a network node such as a base station (e.g. a gNB). The signaling message may be an RRC message. Alternatively, in some embodiments, the set of preambles may be predefined in the terminal device.

In block 504, the terminal device may determine a first RNTI, which may be called TS-RNTI (two-step RNTI), based on at least one of: the numbering of a set of physical random access channel, PRACH, occasions, the numbering of a set of preambles, the numbering of a set of PUSCH occasions and a set of RNTI values, and based on the numbering of the RNTI values in the set.

After determining the RNTI in block 504, in block 506, the terminal device may generate a PUSCH message based on the determined first RNTI. Generally, the determined first RNTI is utilized to scrambling encoded bits of the PUSCH message. Then in block 508, the terminal device may transmit a request message (i.e. message A) to the network node in the two-step random access procedure. The request message may comprise the preamble determined in block 502 and the PUSCH message generated in block 506. The preamble may be transmitted in the PRACH occasion, and the PUSCH message may be transmitted in the PUSCH occasion. In response to transmitting the request message, the terminal device may receive a response message (e.g. message B) based on a second RNTI from the network node, as shown in block 510.

In some embodiments, the order of the RNTI values is arranged based on at least one of the following: an order of indexes of preambles associated with the RNTI values in a PRACH occasion; an order of frequency resource indexes of PRACH occasions associated with the RNTI values; an order of time resource indexes of PRACH occasions associated with the RNTI values; an order of indexes for PRACH slots associated with the RNTI values. It is noted that the first RNTI used in the two-step random access procedure is designed differently from the RA-RNTI and thus will not collide with the RA-RNTI.

Figure 6:
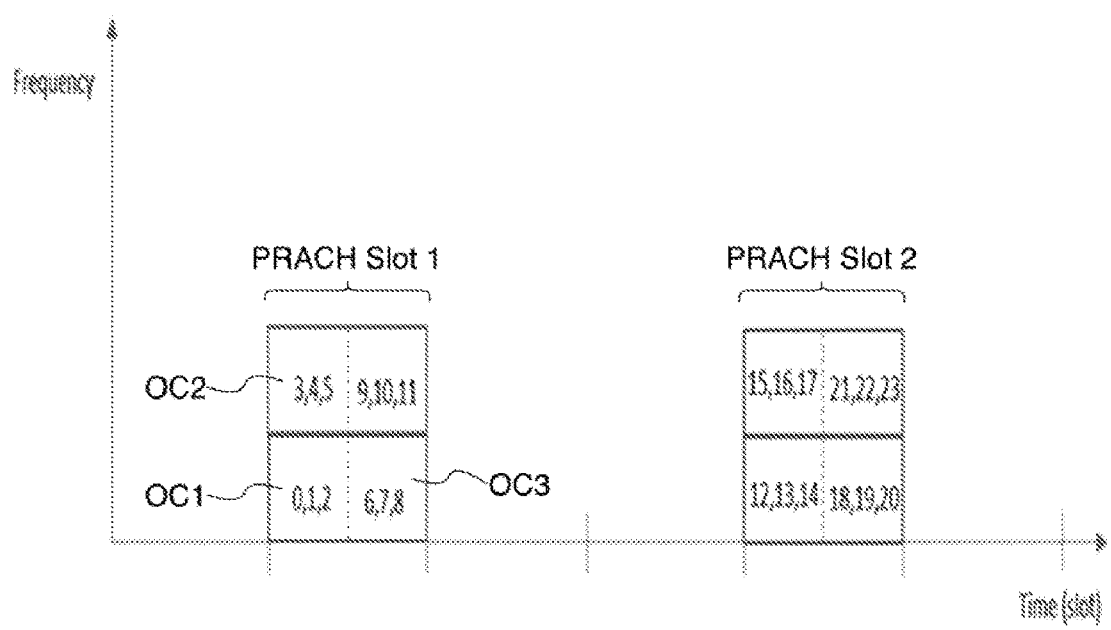
FIG. 6 is an example illustrating RNTIs ordering in time, frequency domain over different PRACH occasions.

FIG. 6 is an example illustrating RNTIs ordering in time, frequency domain over different PRACH occasions. First, the order of the RNTI values is arranged based on an increasing order of indexes of preambles in a PRACH occasion (e.g., the indexes of the RNTI values 0, 1, 2 in a PRACH occasion OC1). Second, the order of the RNTI values is arranged based on an increasing order of frequency resource indexes of PRACH occasions (e.g., the indexes of the RNTI values 3, 4, 5 in a PRACH occasion OC2; the frequency resources of the PRACH occasion OC2 are higher than those of the PRACH occasion OC1). Third, the order of the RNTI values is arranged based on an increasing order of time resource indexes of PRACH occasions (e.g., the indexes of the RNTI values 6, 7, 8 in a PRACH occasion OC3; the time slot of the PRACH occasion OC3 is larger than those of the PRACH occasion OC1). Fourth, the order of the RNTI values is arranged based on an increasing order of indexes for PRACH slots (e.g., the indexes of the RNTI values 0-11 are in a PRACH slot 1; the indexes of the RNTI values 12-23 are in a PRACH slot 2). FIG. 6 is an example illustrating three indexes of preambles (0-2) configured in every PRACH occasion and the RNTIs for the first 8 PRACH occasions. It should be noted that it is also possible to do the ordering in any other specified order, e.g. frequency resource, time resource, preamble resource. The determined order can be either predetermined or RRC configured. In this embodiment, the terminal device is able to compute the RNTI when the selected preamble is transmitted. In the same embodiment, the network node can calculate the RNTI when it receives a specific preamble on a specific PRACH occasion.

Figures 7, 8:
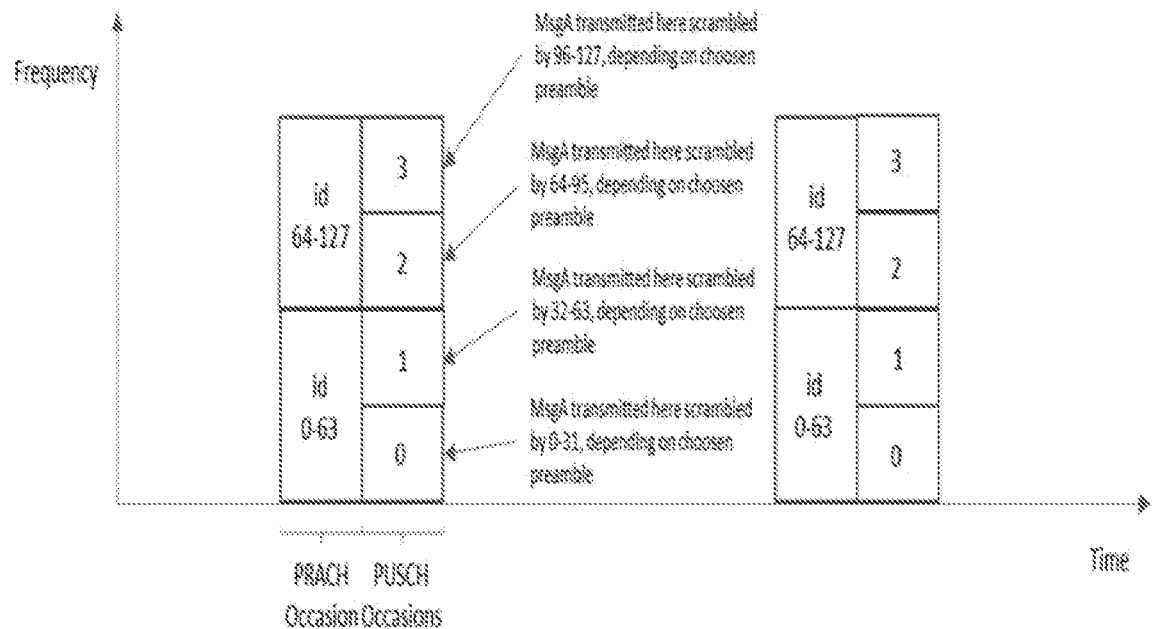
FIG. 7 is a diagram illustrating 64 preamble indexes are used in each of two frequency multiplexed PRACH occasions.
FIG. 8 is a flowchart illustrating a method 800 according to some embodiments described throughout this disclosure.

It is also possible to only use a subset of the indices, e.g. an ordering based on the indexes of preambles and the indexes of frequency for frequency multiplexed PRACH. This is shown in FIG. 7, where 64 preamble indexes (0-63) are used in each of two frequency multiplexed PRACH occasions. This gives 0-127 as possible first RNTIs. The PUSCH occasions are also linked to the preambles and PRACH occasions so that e.g. the first 32 indices in each PRACH occasion maps to the PUSCH occasion with the lower frequency index. In this embodiment, the indexes of RNTIs 0-63 are arranged in the first PRACH occasion and the indexes of RNTIs 64-127 are arranged in the second PRACH occasion. A message A (Msg A) transmitted in PUSCH occasion 0 would then be scrambled by the indexes of RNTIs 0-31 depending on the chosen preamble, MsgA transmitted in PUSCH occasion 1 would be scrambled by the indexes of RNTIs 32-63 depending on the chosen preamble, MsgA transmitted in PUSCH occasion 3 would be scrambled by the indexes of RNTIs 64-95 depending on the chosen preamble and finally MsgA transmitted in PUSCH occasion 3 would be scrambled by the indexes of RNTIs 96-127 depending on the chosen preamble.

In some embodiment, the set of RNTI values is determined based on at least one of: a frequency band utilized, a time gap between the first preamble and the PUSCH, a timing/frequency resource of the request message, and an ID of the terminal device.

Regarding the frequency band, for example, in unlicensed band, RA-RNTI or modified RA-RNTI cannot be used for TS-RNTI, as RA-RNTI may be not available when the network node is preparing the PUSCH while waiting for a LBT for the transmission of the preamble in message A. Or to avoid the RA-RNTI not available issue, always generate an RA-RNTI based on the RO of the e.g. $1^{st}$ LBT. In licensed band, the TS-RNTI can be either RA-RNTI or a modified RA-RNTI, or a new defined RNTI.

Regarding the time gap between the first preamble and the PUSCH, for example, when the gap is no less than a threshold, the RA-RNTI or modified RA-RNTI can be applied for message A and message B transmissions in the two-steps random access procedure, otherwise an RNTI independent from RA-RNTI is used. The threshold can be either predetermined or signaled in RRC signaling, which is not limited here. Further, the RNTI for the message A scrambling can be more directly dependent on the time distance between preamble and PUSCH. The dependence may be based on the time in seconds between preamble and PUSCH, and/or on number of OFDM symbols and/or slots, and/or on number of PRACH occasions (in time and/or frequency) between preamble and PUSCH.

Regarding the timing/frequency resource of the request message, for message B, an RNTI that is based on the timing/frequency of the corresponding the transmission of message A. This is preferred especially when message A PUSCHs from different terminal devices have different PUSCH occasions, so that different terminal devices will use different RNTIs. Further, if preamble position in time can be determined from PUSCH position in time (e.g. if configuration is such that PUSCH follows immediately after preamble, or with a time gap smaller than a given threshold, cf. previous subsection), the RNTI for message A scrambling could be independent of time, while otherwise RNTI for message A scrambling could be dependent on time. When/if message A RNTI is not dependent on time, message B RNTI could still be dependent on time. As a special case, the message A RNTI could be identical to message B RNTI, except with time dependence omitted. The gap thresholds mentioned above (also in previous subsection) may be predetermined in specifications, and/or be signaled, either explicitly, or implied by other signaling, e.g. the PRACH configuration index. Instead of basing the choice of scrambling on a time gap threshold, the choice could be signaled.

Regarding the ID of the terminal device, the ID of the terminal device itself or some RNTI mapped from the ID of the terminal device can be used for the scrambling of message B. An example of the detail design of the ID of the terminal device based TS-RNTI to make sure that message B is scrambled by a different value than message 2 (which is scrambled by RA-RNTI) is provided as below:

The space of possible RA-RNTI values is approximately 18000 values (majority of them unused in any configuration)

. In the case when the scrambling is done based on an ID of the terminal device (RRC Idle/Inactive) and 16 bits are used to scramble message B, the first 15 bits from the ID of the terminal device are used as the 15 LSB bits and set the MSB bit of the TS-RNTI to be 1 to make sure the number be higher than 18000 which is larger and close to the maximum of the RA-RNTI. This makes the TS-RNTI different from RA-RNTI, such that message B and message 2 can be identified by different scrambling sequences. Table 2 is provided to define a range of RNTI values according to an embodiment of the present disclosure.

TABLE 2

| Value (hexa-decimal) | RNTI |
|---|---|
| 0000 | N/A |
| 0001-FFEF | RA-RNTI, Temporary C-RNTI, C-RNTI, MCS-C-RNTI, CS-RNTI, TPC-PUCCH-RNTI, TPC-PUSCH-RNTI, TPC-SRS-RNTI, INT-RNTI, SFI-RNTI, and SP-CSI-RNTI, TS-RNTI (>18000, i.e. 0x4650) |
| FFF0-FFFD | Reserved |
| FFFE | P-RNTI |
| FFFF | SI-RNTI |

FIG. 8 is a flowchart illustrating a method 800 according to some embodiments described throughout this disclosure. The method 800 illustrated in FIG. 8 may be performed by an apparatus implemented in a network node or communicatively coupled to a network node. In accordance with an exemplary embodiment, the network node may be a base station, e.g. a gNB. In the following description with respect to FIG. 8, for the same or similar parts as those in the previous exemplary embodiments, the detailed description will be properly omitted.

According to the exemplary method 800 illustrated in FIG. 8, the network node may receive a request message including a preamble and a PUSCH message in a two-step random access procedure, as shown in block 802. The PUSCH message is received based on a first radio network temporary identity (RNTI). In block 804, the network node may generate a response message based on a second RNTI. Then, in block 806, the network node may transmit the response message to the terminal device.

In an embodiment, the network node uses an identity (ID) of a cell in which the terminal device is located to determine an RNTI to scramble the CRC of a PDCCH that schedules a msgB, or 'msgB RA-RNTI'. The ID of the terminal device is carried in the PUSCH message of message A. In some embodiments, the terminal device scrambles the PUSCH message carried in the payload of message A with a cell identity in addition to transmitting its UE ID (such as C-RNTI or UE contention resolution identity) of message A. Since the network node receives the UE ID of message directly in the PUSCH payload and all terminal devices in a cell use the same PUSCH scrambling, that cell ID can be used for PUSCH reception. Therefore, it is not necessary to blindly decode PUSCH with multiple scrambling hypotheses or to determine the PUSCH scrambling from the preamble carried in message A in such embodiments. The new 'message B' RA-RNTI may be formed not as a copy but as a function/mapping of the C-RNTI used in message A, e.g. selecting an RA-RNTI from a group of possibilities using a hash or a subset of bits of the msgA RNTI. Similarly, in some embodiments where message A carries a UE contention resolution identity or CCCH SDU that has more bits than the message B RA-RNTI, the terminal device may either use a subset of or a hash of the bits in the UE contention resolution identity to produce the msgB RA-RNTI. In some embodiments, the UE contention resolution identity is derived from a CCCH SDU as described in 3GPP TS 38.321 rev. 15.4.0 subclause 6.1.3.3. The scrambling sequence generation for PUSCH can be done using a modification of 3GPP TS 38.211 rev. 15.4.0 subclause 6.3.1.1, the disclosure of which is incorporated by reference herein in its entirety, where $c_{init}=N_{ID}^{cell}$ such that the scrambling sequence generator is initialized with the cell ID when the PUSCH is used for transmission of message A, and otherwise Rel-15 mechanism is used.

It can be therefore seen that, with the proposed solutions for the two-step random access procedure according to the above embodiments, the terminal device and/or the network node can determine the RNTI used for the PUSCH in the request message (message A) and/or the PDCCH CRC scrambling and PDSCH scrambling in the response message (message B) in the two-step random access procedure.

The various blocks shown in FIGS. 3-5 and 8 may be viewed as method steps, and/or as operations that result from operation of computer program code, and/or as a plurality of coupled logic circuit elements constructed to carry out the associated function(s). The schematic flow chart diagrams described above are generally set forth as logical flow chart diagrams. As such, the depicted order and labeled steps are indicative of specific embodiments of the presented methods. Other steps and methods may be conceived that are equivalent in function, logic, or effect to one or more steps, or portions thereof, of the illustrated methods. Additionally, the order in which a particular method occurs may or may not strictly adhere to the order of the corresponding steps shown.

Figure 9:
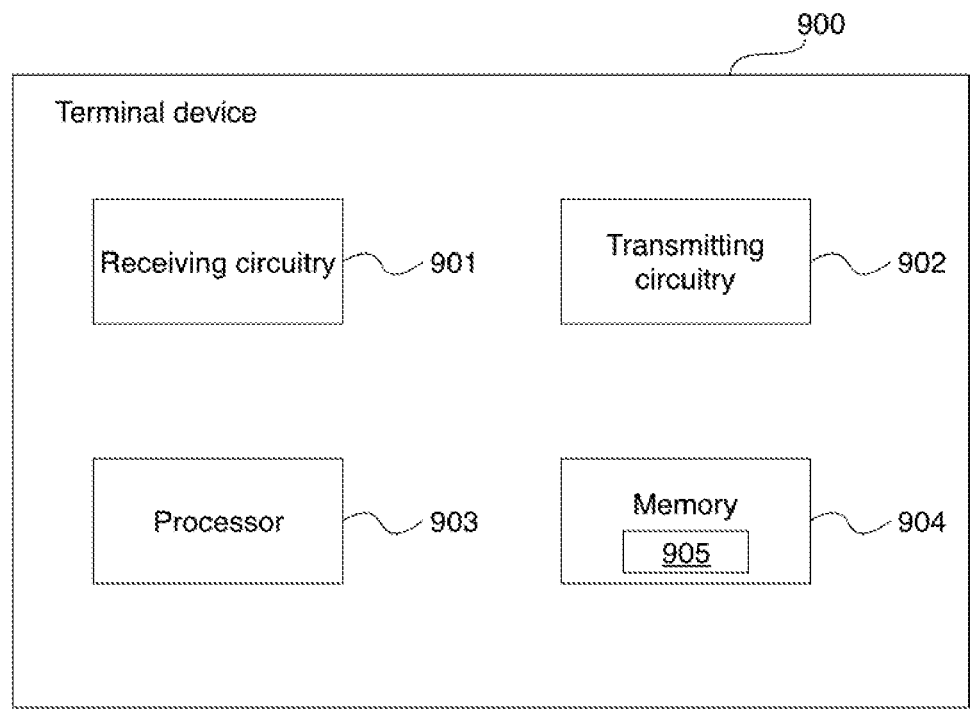
FIG. 9 is a block diagram illustrating a terminal device 900 according to some embodiments described throughout this disclosure.

FIG. 9 is a block diagram illustrating a terminal device 900 according to some embodiments described throughout this disclosure. In an exemplary embodiment, the terminal device 900 may be a UE. As shown in FIG. 9, the terminal device 900 may comprise a receiving circuitry 901, a transmitting circuitry 902, one or more processors such as processor 903 and one or more memories such as memory 904, and non-transitory computer-readable medium 904 having stored thereon computer-executable instructions. The processor 903 is coupled to the receiving circuitry 901, the transmitting circuitry 902 and the non-transitory computer-readable medium 904. Optionally, the receiving circuitry 901, the transmitting circuitry 902, the processor 903, the memory 904 and/or the non-transitory computer-readable medium 904 may be operable to carry out more or less operations to implement the proposed methods according to the exemplary embodiments of the present disclosure.

Figure 10:
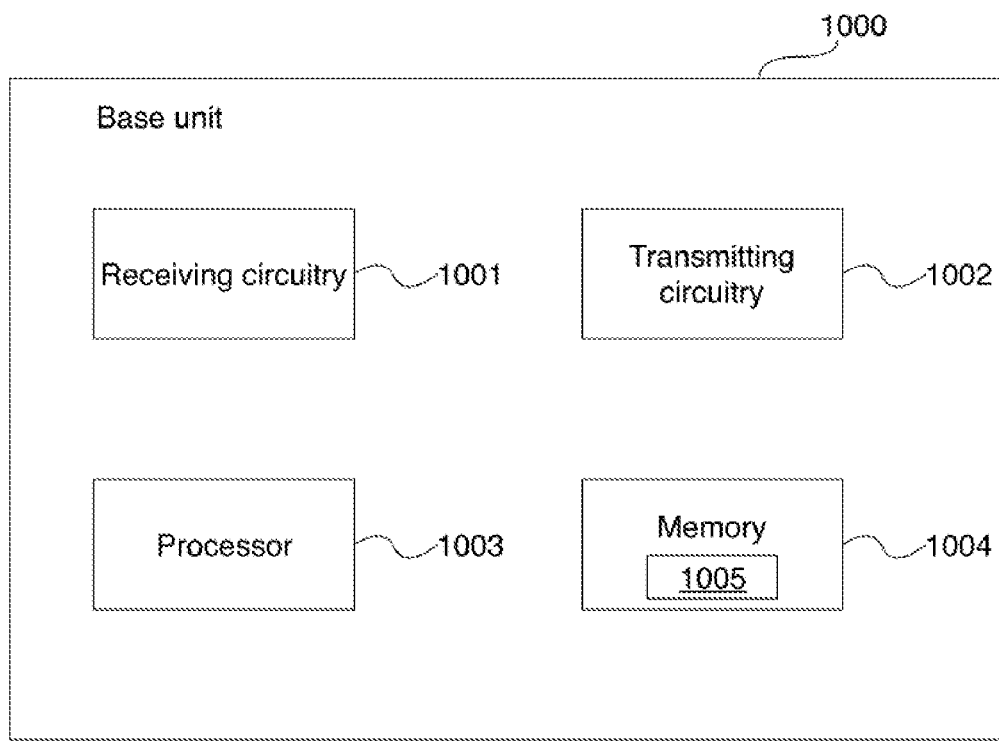
FIG. 10 is a block diagram illustrating a network node 1000 according to some embodiments described throughout this disclosure.

FIG. 10 is a block diagram illustrating a network node 1000 according to some embodiments described throughout this disclosure. In an exemplary embodiment, the network node 1000 may be a gNB or an eNB. As shown in FIG. 10, the network node 1000 may comprise a receiving circuitry 1001, a transmitting circuitry 1002, one or more processors such as processor 1003 and one or more memories such as memory 1004, and non-transitory computer-readable medium 1005 having stored thereon computer-executable instructions. The processor 1003 is coupled to the receiving circuitry 1001, the transmitting circuitry 1002 and the non-transitory computer-readable medium 1005. Optionally, the receiving circuitry 1001, the transmitting circuitry 1002, the processor 1003, the memory 1004 and/or the non-transitory computer-readable medium 1005 may be operable to carry out more or less operations to implement the proposed methods according to the exemplary embodiments of the present disclosure.

Figure 11:
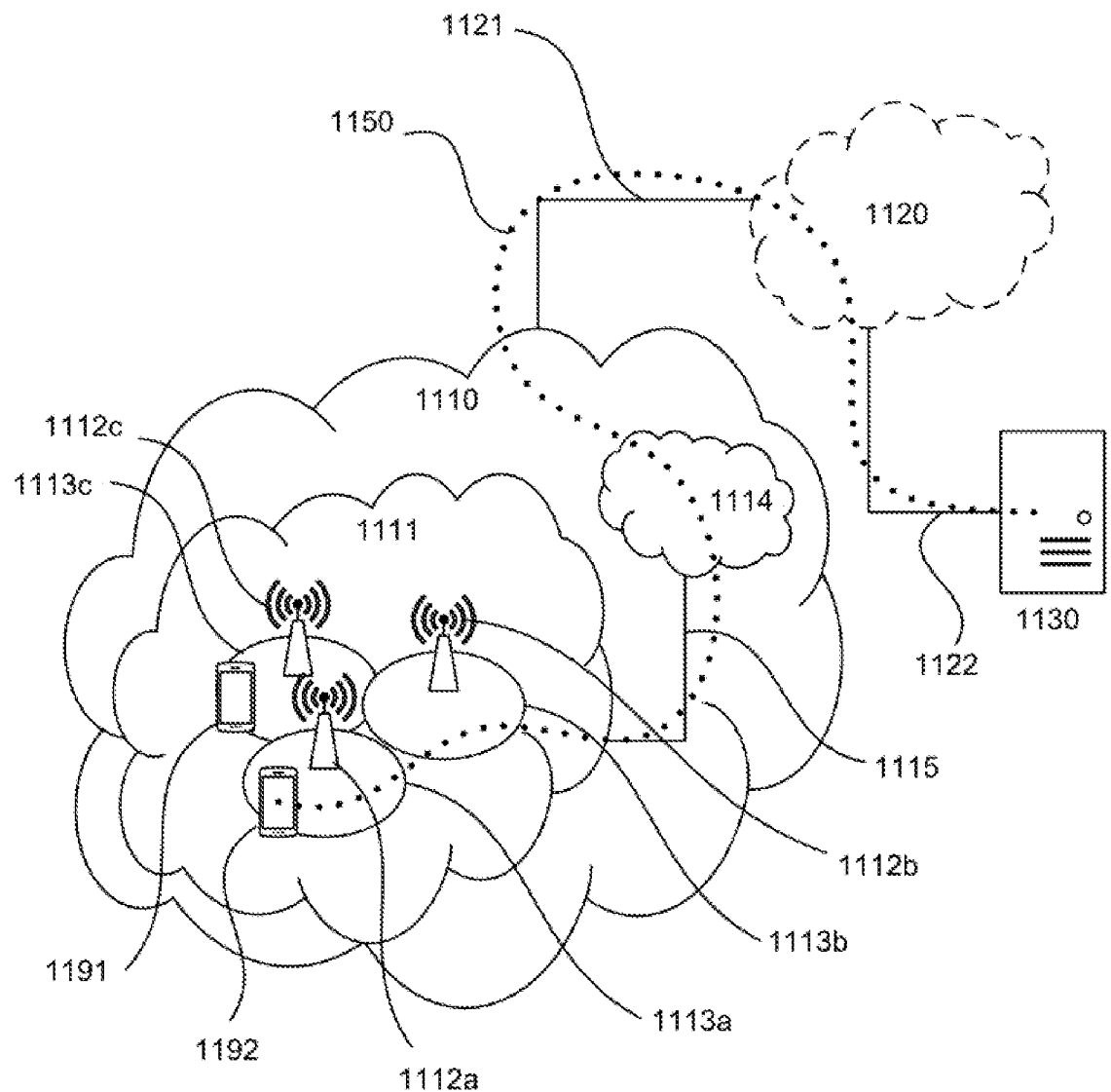
FIG. 11 is a block diagram illustrating a telecommunication network connected via an intermediate network to a host computer in accordance with some embodiments of the present disclosure.

FIG. 11 is a block diagram illustrating a telecommunication network connected via an intermediate network to a host computer in accordance with some embodiments of the present disclosure.

With reference to FIG. 11, in accordance with an embodiment, a communication system includes a telecommunication network 1110, such as a 3GPP-type cellular network, which comprises an access network 1111, such as a radio access network, and a core network 1114. The access network 1111 comprises a plurality of base stations 1112a, 1112b, 1112c, such as NBs, eNBs, gNBs or other types of wireless access points, each defining a corresponding coverage area 1113a, 1113b, 1113c. Each base station 1112a, 1112b, 1112c is connectable to the core network 1114 over a wired or wireless connection 1115. A first UE 1191 located in a coverage area 1113c is configured to wirelessly connect to, or be paged by, the corresponding base station 1112c. A second UE 1192 in a coverage area 1113a is wirelessly connectable to the corresponding base station 1112a. While a plurality of UEs 1191, 1192 are illustrated in this example, the disclosed embodiments are equally applicable to a situation where a sole UE is in the coverage area or where a sole UE is connecting to the corresponding base station 1112.

The telecommunication network 1110 is itself connected to a host computer 1130, which may be embodied in the hardware and/or software of a standalone server, a cloud-implemented server, a distributed server or as processing resources in a server farm. The host computer 1130 may be under the ownership or control of a service provider, or may be operated by the service provider or on behalf of the service provider. Connections 1121 and 1122 between the telecommunication network 1110 and the host computer 1130 may extend directly from the core network 1114 to the host computer 1130 or may go via an optional intermediate network 1120. An intermediate network 1120 may be one of, or a combination of more than one of, a public, private or hosted network; the intermediate network 1120, if any, may be a backbone network or the Internet; in particular, the intermediate network 1120 may comprise two or more sub-networks (not shown).

The communication system of FIG. 11 as a whole enables connectivity between the connected UEs 1191, 1192 and the host computer 1130. The connectivity may be described as an over-the-top (OTT) connection 1150. The host computer 1130 and the connected UEs 1191, 1192 are configured to communicate data and/or signaling via the OTT connection 1150, using the access network 1111, the core network 1114, any intermediate network 1120 and possible further infrastructure (not shown) as intermediaries. The OTT connection 1150 may be transparent in the sense that the participating communication devices through which the OTT connection 1150 passes are unaware of routing of uplink and downlink communications. For example, the base station 1112 may not or need not be informed about the past routing of an incoming downlink communication with data originating from the host computer 1130 to be forwarded (e.g., handed over) to a connected UE 1191. Similarly, the base station 1112 need not be aware of the future routing of an outgoing uplink communication originating from the UE 1191 towards the host computer 1130.

Figure 12:
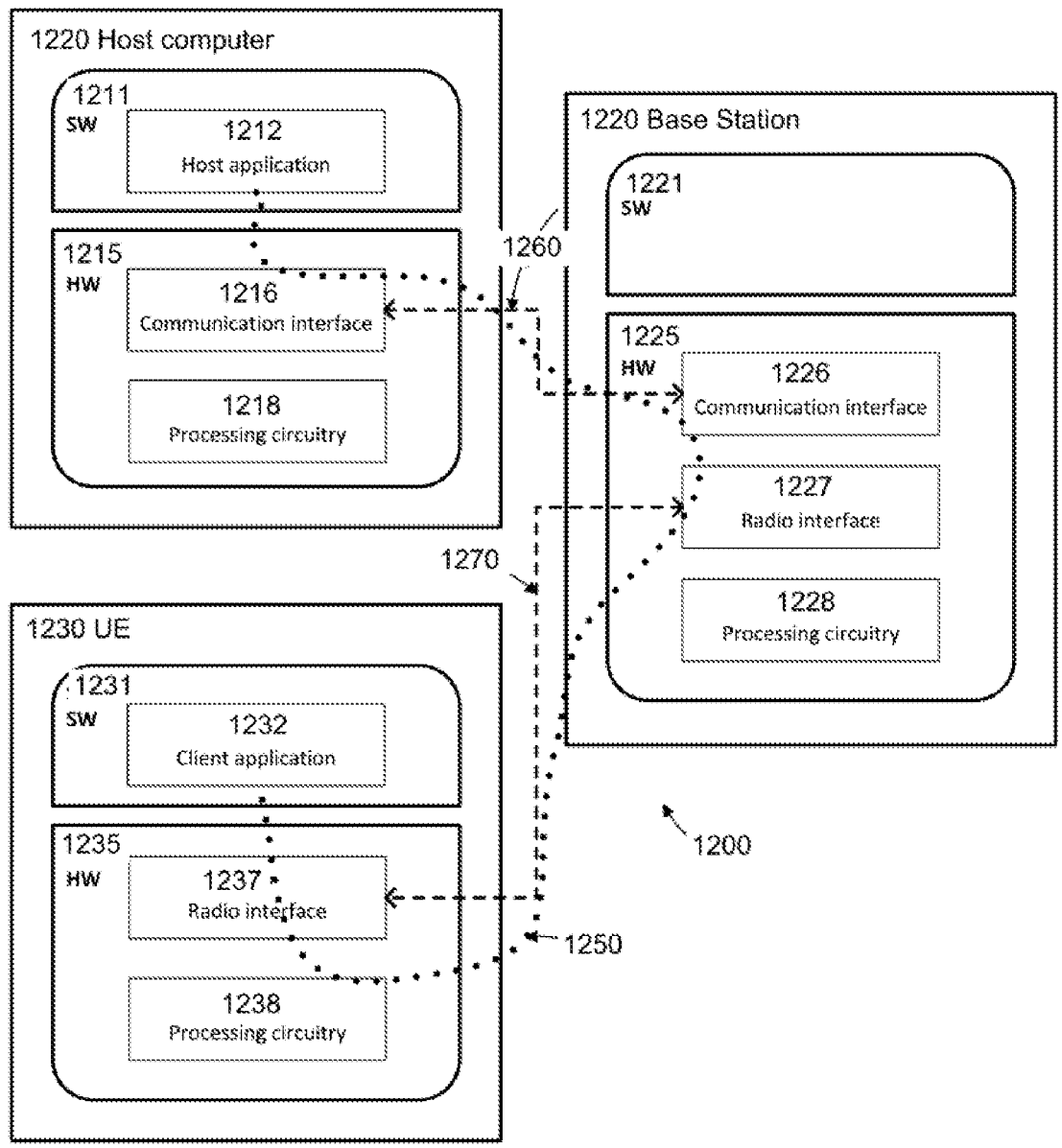
FIG. 12 is a block diagram illustrating a host computer communicating via a base station with a UE over a partially wireless connection in accordance with some embodiments of the present disclosure.

FIG. 12 is a block diagram illustrating a host computer communicating via a base station with a UE over a partially wireless connection in accordance with some embodiments of the present disclosure.

Example implementations, in accordance with an embodiment, of the UE, base station and host computer discussed in the preceding paragraphs will now be described with reference to FIG. 12. In a communication system 1200, a host computer 1210 comprises hardware 1215 including a communication interface 1216 configured to set up and maintain a wired or wireless connection with an interface of a different communication device of the communication system 1200. The host computer 1210 further comprises a processing circuitry 1218, which may have storage and/or processing capabilities. In particular, the processing circuitry 1218 may comprise one or more programmable processors, application-specific integrated circuits, field programmable gate arrays or combinations of these (not shown) adapted to execute instructions. The host computer 1210 further comprises software 1211, which is stored in or accessible by the host computer 1210 and executable by the processing circuitry 1218. The software 1211 includes a host application 1212. The host application 1212 may be operable to provide a service to a remote user, such as UE 1230 connecting via an OTT connection 1250 terminating at the UE 1230 and the host computer 1210. In providing the service to the remote user, the host application 1212 may provide user data which is transmitted using the OTT connection 1250.

The communication system 1200 further includes a base station 1220 provided in a telecommunication system and comprising hardware 1225 enabling it to communicate with the host computer 1210 and with the UE 1230. The hardware 1225 may include a communication interface 1226 for setting up and maintaining a wired or wireless connection with an interface of a different communication device of the communication system 1200, as well as a radio interface 1227 for setting up and maintaining at least a wireless connection 1270 with the UE 1230 located in a coverage area (not shown in FIG. 12) served by the base station 1220. The communication interface 1226 may be configured to facilitate a connection 1260 to the host computer 1210. The connection 1260 may be direct or it may pass through a core network (not shown in FIG. 12) of the telecommunication system and/or through one or more intermediate networks outside the telecommunication system. In the embodiment shown, the hardware 1225 of the base station 1220 further includes a processing circuitry 1228, which may comprise one or more programmable processors, application-specific integrated circuits, field programmable gate arrays or combinations of these (not shown) adapted to execute instructions. The base station 1220 further has software 1221 stored internally or accessible via an external connection.

The communication system 1200 further includes the UE 1230 already referred to. Its hardware 1235 may include a radio interface 1237 configured to set up and maintain a wireless connection 1270 with a base station serving a coverage area in which the UE 1230 is currently located. The hardware 1235 of the UE 1230 further includes a processing circuitry 1238, which may comprise one or more programmable processors, application-specific integrated circuits, field programmable gate arrays or combinations of these (not shown) adapted to execute instructions. The UE 1230 further comprises software 1231, which is stored in or accessible by the UE 1230 and executable by the processing circuitry 1238. The software 1231 includes a client application 1232. The client application 1232 may be operable to provide a service to a human or non-human user via the UE 1230, with the support of the host computer 1210. In the host computer 1210, an executing host application 1212 may communicate with the executing client application 1232 via the OTT connection 1250 terminating at the UE 1230 and the host computer 1210. In providing the service to the user, the client application 1232 may receive request data from the host application 1212 and provide user data in response to the request data. The OTT connection 1250 may transfer both the request data and the user data. The client application 1232 may interact with the user to generate the user data that it provides.

It is noted that the host computer 1210, the base station 1220 and the UE 1230 illustrated in FIG. 12 may be similar or identical to the host computer 1230, one of base stations 1212*a*, 1212*b*, 1212*c* and one of UEs 1291, 1292 of FIG. 12, respectively. This is to say, the inner workings of these entities may be as shown in FIG. 12 and independently, the surrounding network topology may be that of FIG. 12.

In FIG. 12, the OTT connection 1250 has been drawn abstractly to illustrate the communication between the host computer 1210 and the UE 1230 via the base station 1220, without explicit reference to any intermediary devices and the precise routing of messages via these devices. Network infrastructure may determine the routing, which it may be configured to hide from the UE 1230 or from the service provider operating the host computer 1210, or both. While the OTT connection 1250 is active, the network infrastructure may further take decisions by which it dynamically changes the routing (e.g., on the basis of load balancing consideration or reconfiguration of the network).

Wireless connection 1270 between the UE 1230 and the base station 1220 is in accordance with the teachings of the embodiments described throughout this disclosure. One or more of the various embodiments improve the performance of OTT services provided to the UE 1230 using the OTT connection 1250, in which the wireless connection 1270 forms the last segment. More precisely, the teachings of these embodiments may improve the latency and the power consumption, and thereby provide benefits such as lower complexity, reduced time required to access a cell, better responsiveness, extended battery lifetime, etc.

A measurement procedure may be provided for the purpose of monitoring data rate, latency and other factors on which the one or more embodiments improve. There may further be optional network functionality for reconfiguring the OTT connection 1250 between the host computer 1210 and the UE 1230, in response to variations in the measurement results. The measurement procedure and/or the network functionality for reconfiguring the OTT connection 1250 may be implemented in software 1211 and hardware 1215 of the host computer 1210 or in software 1231 and hardware 1235 of the UE 1230, or both. In embodiments, sensors (not shown) may be deployed in or in association with communication devices through which the OTT connection 1250 passes; the sensors may participate in the measurement procedure by supplying values of the monitored quantities exemplified above, or supplying values of other physical quantities from which the software 1211, 1231 may compute or estimate the monitored quantities. The reconfiguring of the OTT connection 1250 may include message format, retransmission settings, preferred routing etc.; the reconfiguring need not affect the base station 1220, and it may be unknown or imperceptible to the base station 1220. Such procedures and functionalities may be known and practiced in the art. In certain embodiments, measurements may involve proprietary UE signaling facilitating the host computer 1210's measurements of throughput, propagation times, latency and the like. The measurements may be implemented in that the software 1211 and 1231 causes messages to be transmitted, in particular empty or 'dummy' messages, using the OTT connection 1250 while it monitors propagation times, errors etc.

Figure 13:
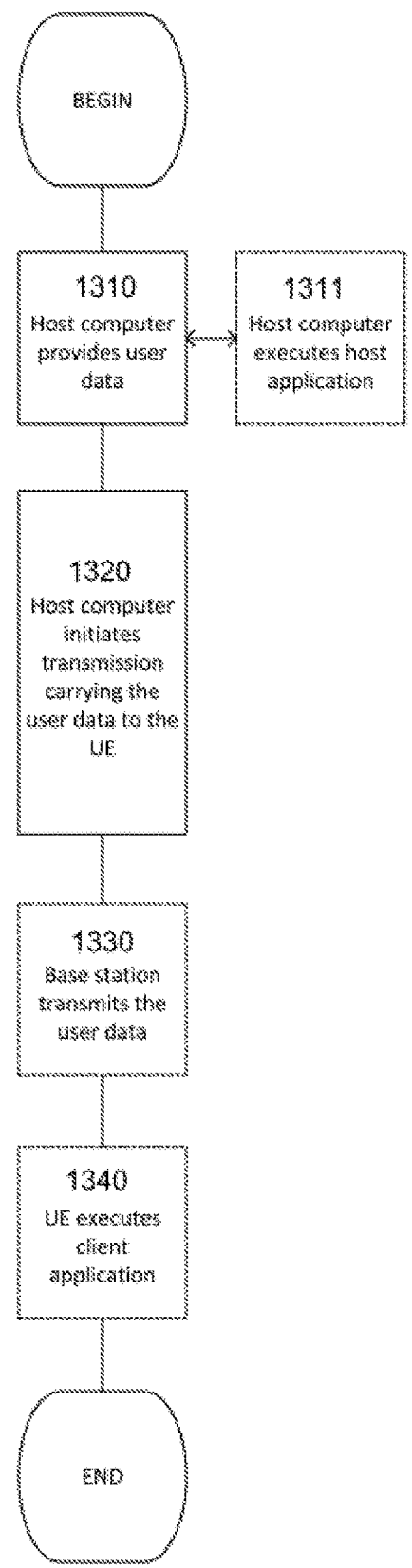
FIG. 13 is a flowchart illustrating a method implemented in a communication system, in accordance with an embodiment of the present disclosure.

FIG. 13 is a flowchart illustrating a method implemented in a communication system, in accordance with an embodiment. The communication system includes a host computer, a base station and a UE which may be those described with reference to FIG. 11 and FIG. 12. For simplicity of the present disclosure, only drawing references to FIG. 13 will be included in this section. In step 13010, the host computer provides user data. In substep 1311 (which may be optional) of step 1310, the host computer provides the user data by executing a host application. In step 1320, the host computer initiates a transmission carrying the user data to the UE. In step 1330 (which may be optional), the base station transmits to the UE the user data which was carried in the transmission that the host computer initiated, in accordance with the teachings of the embodiments described throughout this disclosure. In step 1340 (which may also be optional), the UE executes a client application associated with the host application executed by the host computer.

Figure 14:
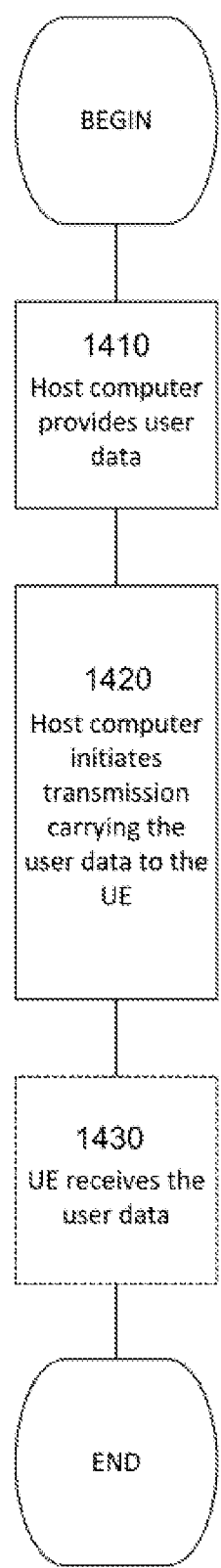
FIG. 14 is a flowchart illustrating a method implemented in a communication system, in accordance with an embodiment of the present disclosure.

FIG. 14 is a flowchart illustrating a method implemented in a communication system, in accordance with an embodiment. The communication system includes a host computer, a base station and a UE which may be those described with reference to FIG. 11 and FIG. 12. For simplicity of the present disclosure, only drawing references to FIG. 14 will be included in this section. In step 1410 of the method, the host computer provides user data. In an optional substep (not shown) the host computer provides the user data by executing a host application. In step 1420, the host computer initiates a transmission carrying the user data to the UE. The transmission may pass via the base station, in accordance with the teachings of the embodiments described throughout this disclosure. In step 1430 (which may be optional), the UE receives the user data carried in the transmission.

Figure 15:
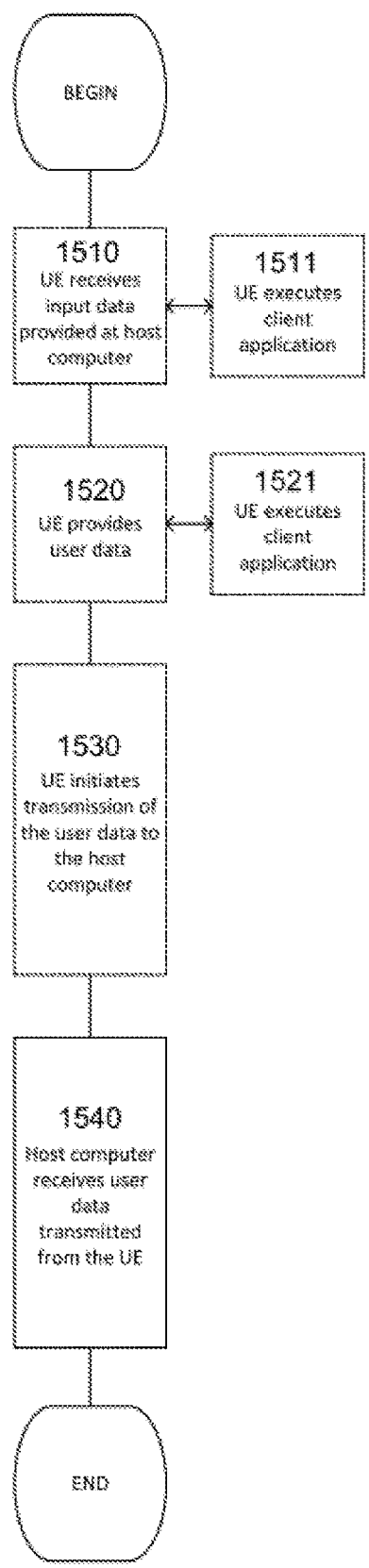
FIG. 15 is a flowchart illustrating a method implemented in a communication system, in accordance with an embodiment of the present disclosure.

FIG. 15 is a flowchart illustrating a method implemented in a communication system, in accordance with an embodiment. The communication system includes a host computer, a base station and a UE which may be those described with reference to FIG. 11 and FIG. 12. For simplicity of the present disclosure, only drawing references to FIG. 15 will be included in this section. In step 1510 (which may be optional), the UE receives input data provided by the host computer. Additionally or alternatively, in step 1520, the UE provides user data. In substep 1521 (which may be optional) of step 1520, the UE provides the user data by executing a client application. In substep 1511 (which may be optional) of step 1510, the UE executes a client application which provides the user data in reaction to the received input data provided by the host computer. In providing the user data, the executed client application may further consider user input received from the user. Regardless of the specific manner in which the user data was provided, the UE initiates, in substep 1530 (which may be optional), transmission of the user data to the host computer. In step 1540 of the method, the host computer receives the user data transmitted from the UE, in accordance with the teachings of the embodiments described throughout this disclosure.

Figure 16:
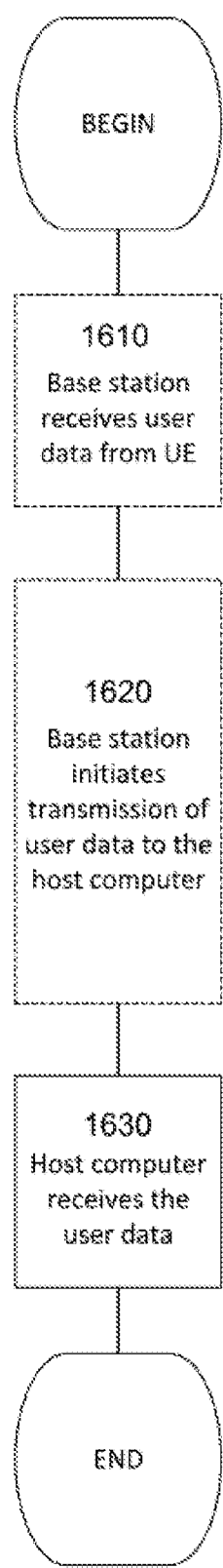
FIG. 16 is a flowchart illustrating a method implemented in a communication system, in accordance with an embodiment of the present disclosure.

FIG. 16 is a flowchart illustrating a method implemented in a communication system, in accordance with an embodiment. The communication system includes a host computer, a base station and a UE which may be those described with reference to FIG. 11 and FIG. 12. For simplicity of the present disclosure, only drawing references to FIG. 16 will be included in this section. In step 1610 (which may be optional), in accordance with the teachings of the embodiments described throughout this disclosure, the base station receives user data from the UE. In step 1620 (which may be optional), the base station initiates transmission of the received user data to the host computer. In step 1630 (which may be optional), the host computer receives the user data carried in the transmission initiated by the base station.

In general, the various exemplary embodiments may be implemented in hardware or special purpose chips, circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, random access memory (RAM), etc. As will be appreciated by one of skill in the art, the function of the program modules may be combined or distributed as desired in various embodiments. In addition, the function may be embodied in whole or partly in firmware or hardware equivalents such as integrated circuits, field programmable gate arrays (FPGA), and the like.

Some preferred embodiments of the present disclosure are provided below for better understanding.

Embodiment 1: The RNTI Used for in 2-Step RA Depends on the RRC Status

In one embodiment, if UE does not possess a valid C-RNTI, e.g. in idle mode, a CS-RNTI (Configured Scheduling RNTI) is used. The CS-RNTI can have one or multiple RNTI values which can be cell specifically configured. The CS-RNTI values may be provided e.g. in the RMSI or OSI. The UE selects the actual CS-RNTI value to be used from the configured multiple-value set. When UE has a C-RNTI, e.g. is in RRC connected mode and is to perform CFRA, in one embodiment, it uses its C-RNTI.

In another embodiment, e.g. in inactive mode and performing CBRA, it may use a CS-RNTI that is based on its C-RNTI, e.g. a function of some bits in the C-RNTI. This reduces the blind decoding complexity for the gNB receiver, compared to tentatively detecting all inactive UE C-RNTIs in the system or the tracking area.

In one embodiment, if one or more UE attempts with C-RNTI or C-RNTI-based CS-RNTI are unsuccessful, it may revert to the approach where the UE does not possess valid C-RNTI above for subsequent attempts.

Embodiment 1a: The CS-RNTI Used for Scrambling msgA PUSCH Payload in 2-Step RA Depends on the msgA Preamble Used by the UE For a UE not possessing a valid C-RNTI, the selected CS-RNTI can be selected based on, and/or be associated with, e.g. the msgA preamble ID, the PRACH occasion, or PRACH preamble format. As the preamble ID and the occasion are selected from a set that is SSB-dependent, this embodiment can alternatively be seen as selecting the CS-RNTI based on the best detected SSB in the cell.

In one embodiment, the gNB detects the PUSCH after detecting the preamble and can use the obtained preamble configuration info to configure PUSCH reception.

In another embodiment, the possible CS-RNTI values can be blindly detected. Then preamble detection is not required, e.g. if the transmission at hand is a retransmission of msgA without retransmitting the preamble.

Embodiment 1b: The CS-RNTI Used for Scrambling msgA PUSCH Payload in 2-Step RA is Selected Based on e.g. PUSCH Parameters, Access Purpose Alternatively, the CS-RNTI may be selected from a set of multiple options provided in SI or in the specification without considering the selected preamble. The CS-RNTI may instead be selected e.g. based on the PUSCH payload properties (size, format) or based on the purpose of performing the RA attempt (short data, regular access).

Embodiment 2: Network Selects the RNTI Used for Scrambling PDCCH CRC of msgB in in 2-Step RA Based on the Received msgA PUSCH RNTI In this embodiment, the NW uses the RNTI (e.g. C-RNTI or CS-RNTI) used by the UE in msgA PUSCH to scramble the CRC of the PDCCH for msgB. The NW detects the CS-RNTI based on the received msgA preamble or based on blind detection of PUSCH. That RNTI then functionally becomes a new RA-RNTI for the given UE.

Alternatively, the new RA-RNTI may be formed not as a copy but as a function/mapping of the C-RNTI or CS-RNTI used in msgA, e.g. selecting a RA-RNTI from a group of possibilities using a hash or a subset of bits of the msgA RNTI.

Such principles for new RA-RNTI definition also allow the NW and the UEs to efficiently differentiate between the 2-step msgB and 4-step msg2 responses.

Embodiment 3: A Separate RNTI, Say TS-RNTI (2-Step-RNTI) is Designed Based on a Numbering of Configured Preamble Ids and PRACH Occasions in a Determined Order The TS-RNTI is associated to the preamble-ids and PRACH occasions and is designed differently from the RA-RNTI and will thus not collide with the RA-RNTI. An example is to derive the TS-RNTI based on a TS-RNTI numbering in the following order, see FIG. 6. First, in increasing order of preamble indexes within a single PRACH occasion. Second, in increasing order of frequency resource indexes for frequency multiplexed PRACH occasions. Third, in increasing order of time resource indexes for time multiplexed PRACH occasions within a PRACH slot. Fourth, in increasing order of indexes for PRACH slots.

It is also possible to do the ordering in any other specified order, e.g. frequency resource, time resource, preamble resource. In this way the UE is able to compute the TS-RNTI when the selected preamble is transmitted. In the same way, the gNB can calculate the TS-RNTI when it receives a specific preamble on a specific PRACH occasion. In the method, the determined order can be either predetermined or RRC configured. An example where 3 preamble ids are configured (0-2) in every PRACH occasion and the TS-RNTIs for the first 8 PRACH occasions are shown in FIG. 6.

It is also possible to only use a subset of the indices, e.g. an ordering based on preamble indices and frequency resource indexes for frequency multiplexed PRACH. This is shown in FIG. 7, where 64 preamble indices (0-63) are used in each in two frequency multiplexed PRACH occasions. This gives 0-127 as possible TS-RNTIs. The PUSCH occasions are also linked to the preambles and PRACH occasions so that e.g. the first 32 indices in each PRACH occasion maps to the PUSCH occasion with the lower frequency index. In this case, the TS-RNTI is 0-63 in the first PRACH occasion and 64-127 in the second. A MsgA transmitted in PUSCH occasion 0 would then be scrambled by an RNTI of 0-31 depending on the chosen preamble, MsgA transmitted in PUSCH occasion 1 would be scrambled by an RNTI of 32-63 depending on the chosen preamble, MsgA transmitted in PUSCH occasion 3 would be scrambled by an RNTI of 64-95 depending on the chosen preamble and finally MsgA transmitted in PUSCH occasion 3 would be scrambled by an RNTI of 96-127 depending on the chosen preamble.

Embodiment 3a: TS-RNTI is Associated to One or More of the Following Factors (i) The Frequency Band Used For example, in unlicensed band, RA-RNTI or modified RA-RNTI cannot be used for TS-RNTI, as RA-RNTI may be not available when UE is preparing the PUSCH while waiting for a LBT for the msgA preamble transmission. Or to avoid the RA-RNTI not available issue, always generate an RA-RNTI based on the RO of the e.g. $1^{st}$ LBT. In licensed band, the TS-RNTI can be either RA-RNTI or a modified RA-RNTI, or a new defined RNTI.

(ii) The Time Gap Between Preamble and msgA PUSCH

For example, when the gap is no less than a threshold, the RA-RNTI or modified RA-RNTI can be applied for msgA and msgB transmissions, otherwise an RNTI independent from RA-RNTI is used. Here the threshold can be either predetermined or signaled in RRC signaling.

Further, the RNTI for MsgA scrambling can be more directly dependent on the time distance between preamble and PUSCH. The dependence may be based on the time in seconds between preamble and PUSCH, and/or on number of OFDM symbols and/or slots, and/or on number of PRACH occasions (in time and/or frequency) between preamble and PUSCH.

(iii) The Timing/Frequency of the msgA Transmission

For MsgB, an RNTI that is based on the timing/frequency of the corresponding transmission of MsgA. This is preferred especially when msgA PUSCHs from different UEs have different PUSCH occasions, so that different UEs will use different RNTIs.

Further, if preamble position in time can be determined from PUSCH position in time (e.g. if configuration is such that PUSCH follows immediately after preamble, or with a time gap smaller than a given threshold, cf. previous subsection), the RNTI for MsgA scrambling could be independent of time, while otherwise RNTI for MsgA scrambling could be dependent on time. When/if MsgA RNTI is not dependent on time, MsgB RNTI could still be dependent on time. As a special case, the MsgA RNTI could be identical to MsgB RNTI, except with time dependence omitted.

The gap thresholds mentioned above (also in previous subsection) may be predetermined in specifications, and/or be signaled, either explicitly, or implied by other signaling, e.g. the PRACH configuration index. Instead of basing the choice of scrambling on a time gap threshold, the choice could be signaled.

(iv) The UE ID

The UE ID itself or some RNTI mapped from UE ID can be used for the scrambling of MsgB. An example of the detail design of the UE ID based TS-RNTI to make sure that MsgB is scrambled by a different value than Msg2 (which is scrambled by RA-RNTI) is provided as below: The space of possible RA-RNTI values is approximately 18000 values (majority of them unused in any configuration). In the case when the scrambling is done based on a UE id (RRC Idle/Inactive) and 16 bits are used to scramble MsgB, the first 15 bits from the UE id are used as the 15 LSB bits and set the MSB bit of the TS-RNTI to be 1 to make sure the number be higher than 18000 which is larger and close to the maximum of the RA-RNTI. This makes the TS-RNTI different from RA-RNTI and MsgB and Msg2 can be identified by different scrambling sequences.

Embodiment 4: Network Selects the RNTI Used for Scrambling the CRC of a PDCCH that Schedules msgB in in 2-Step RA Based on a UE ID Carried in msgA PUSCH In these embodiments, the NW uses an ID of the UE carried in msgA PUSCH to determine an RNTI to use to scramble the CRC of a PDCCH that schedules a msgB, or 'msgB RA-RNTI'.

In some embodiments, the UE scrambles PUSCH msgA payload with a cell identity in addition to transmitting its msgA UE ID (such as C-RNTI or UE contention resolution identity). Since the gNB receives the msgA UE ID directly in the PUSCH payload and all UEs in a cell use the same PUSCH scrambling, that cell ID can be used for PUSCH reception. Therefore, it is not necessary to blindly decode PUSCH with multiple scrambling hypotheses or to determine the PUSCH scrambling from the msgA preamble in such embodiments.

The new 'msgB' RA-RNTI may be formed not as a copy but as a function/mapping of the C-RNTI used in msgA, e.g. selecting an RA-RNTI from a group of possibilities using a hash or a subset of bits of the msgA RNTI. Similarly, in embodiments where msgA carries a UE contention resolution identity or CCCH SDU that has more bits than the msgB RA-RNTI, the UE may either use a subset of or a hash of the bits in the UE contention resolution identity to produce the msgB RA-RNTI. In some embodiments, the UE contention resolution identity is derived from a CCCH SDU as described in 3GPP TS 38.321 rev. 15.4.0 subclause 6.1.3.3.

The scrambling sequence generation for PUSCH can be done using a modification of 3GPP TS 38.211 rev. 15.4.0 subclause 6.3.1.1, where $c_{init}=N_{ID}^{cell}$ such that the scrambling sequence generator is initialized with the cell ID when the PUSCH is used for transmission of msgA, and otherwise Rel-15 mechanism is used.

According to some embodiments described throughout this disclosure, the present disclosure provides options for how the UE and the network selects the RNTIs for the msgA PUSCH scrambling and/or the msgB PDCCH CRC scrambling and PDSCH scrambling in two-step RACH. The following methods are provided:

(a) The RNTI depends on the RRC status and/or RA type of the UE.
When CS-RNTI is used, it can depend on the preamble, PUSCH parameters, access purpose, or it can be randomly set.

(b) The RNTI used for scrambling PDCCH CRC of msgB in 2-step RA is based on the received msgA PUSCH RNTI.

(c) A separate RNTI, say a TS-RNTI (2-step-RNTI) is designed based on a numbering of configured preamble ids and PRACH occasions in a determined order, where the TS-RNTI can be associated to one or more of the following factors: the frequency band used, and/or the time gap between preamble and msgA PUSCH, and/or the timing/frequency of the msgA transmission, and/or the mapping to the UE ID (only for msgB at least in some cases).

ABBREVIATIONS

CBRA Contention Based Random Access
CFRA Contention Free Random Access
MA Multiple Access
NR New Radio
NW Network
PUSCH Physical Uplink Shared Channel
RACH Random Access Channel
PRACH Physical Random Access Channel
RAR Random Access Response
RNTI Radio Network Temporary Identity
SI System Information
SIB1 System Information Block Type 1
TF Timing and Frequency The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-limiting and exemplary embodiments of this disclosure.

What is claimed is:

1. A method performed by a terminal device, comprising:
    determining a request message for random access, wherein the request message comprises a preamble and a physical uplink shared channel (PUSCH) message and wherein the PUSCH message is determined based on a first radio network temporary identity (RNTI);
    transmitting the request message; and
    obtaining a response message for random access based on a second RNTI;
    wherein the first RNTI is used for scrambling encoded bits of the PUSCH message, and the second RNTI is used for scrambling a cyclic redundancy check (CRC) of a Physical Downlink Control Channel (PDCCH) message scheduling a Physical Downlink Shared Channel (PDSCH) carrying the response message.

2. The method of claim 1, wherein the first RNTI and the second RNTI are the same.

3. The method of claim 1, wherein the first RNTI and the second RNTI are different.

4. The method of claim 1, wherein the second RNTI is determined based on a Radio Resource Control (RRC) status of the terminal device.

5. The method of claim 4, wherein the RRC status comprises a connected mode.

6. The method of claim 1, wherein the second RNTI is determined based on the first RNTI.

7. The method of claim 1, wherein at least one of the first RNTI and the second RNTI is determined based on a numbering of a set of physical random access channel (PRACH) occasions.

8. The method of claim 1, wherein at least one of the first RNTI and the second RNTI is determined based on a set of RNTI values, wherein the set of RNTI values is determined based on a timing/frequency resource of the request message.

9. A method performed by a network node, comprising:
    obtaining, from a terminal device, a request message comprising a preamble and a physical uplink shared channel (PUSCH) message based on a first radio network temporary identity (RNTI);
    determining a response message based on a second RNTI; and
    transmitting the response message to the terminal device;
    wherein the first RNTI is used for scrambling encoded bits of the PUSCH message, and the second RNTI is used for scrambling a cyclic redundancy check (CRC) of a Physical Downlink Control Channel (PDCCH) message scheduling a Physical Downlink Shared Channel (PDSCH) carrying the response message.

10. The method of claim 9, wherein the first RNTI and the second RNTI are the same.

11. The method of claim 9, wherein the first RNTI and the second RNTI are different.

12. The method of claim 9, wherein the second RNTI is determined based on a Radio Resource Control (RRC) status of the terminal device.

13. The method of claim 9, wherein the second RNTI is determined based on the first RNTI.

14. The method of claim 9, wherein at least one of the first RNTI and the second RNTI is determined based on a numbering of a set of physical random access channel (PRACH) occasions.

15. The method of claim 9, wherein at least one of the first RNTI and the second RNTI is determined based on a set of RNTI values, wherein the set of RNTI values is determined based on a timing/frequency resource of the request message.

16. A terminal device, comprising:
    a non-transitory computer-readable medium having stored thereon computer-executable instructions; and
    a processor coupled to the non-transitory computer-readable medium, wherein the computer-executable instructions, when executed by the processor, cause the terminal device to:
determine a request message for random access, wherein the request message comprises a preamble and a physical uplink shared channel (PUSCH) message and wherein the PUSCH message is determined based on a first radio network temporary identity (RNTI);
transmit the request message; and
obtain a response message for random access based on a second RNTI;
wherein the first RNTI is used for scrambling encoded bits of the PUSCH message, and the second RNTI is used for scrambling a cyclic redundancy check (CRC) of a Physical Downlink Control Channel (PDCCH) message scheduling a Physical Downlink Shared Channel (PDSCH) carrying the response message.

* * * * *